US007783445B2

(12) United States Patent
McLean et al.

(10) Patent No.: US 7,783,445 B2
(45) Date of Patent: Aug. 24, 2010

(54) METHOD OF PATH PLANNING

(75) Inventors: Ian William McLean, Edinburgh (GB); Geoffrey McFarland, Wotton-under-Edge (GB); David Sven Wallace, Nympsfield (GB)

(73) Assignee: Renishaw PLC, Wotton-under-Edge (GB)

( * ) Notice: Subject to any disclaimer, the term of this patent is extended or adjusted under 35 U.S.C. 154(b) by 111 days.

(21) Appl. No.: 11/918,985

(22) PCT Filed: Apr. 12, 2006

(86) PCT No.: PCT/GB2006/001335

§ 371 (c)(1),
(2), (4) Date: Oct. 22, 2007

(87) PCT Pub. No.: WO2006/114570

PCT Pub. Date: Nov. 2, 2006

(65) Prior Publication Data
US 2009/0055118 A1 Feb. 26, 2009

(30) Foreign Application Priority Data
Apr. 25, 2005 (GB) ................................. 0508217.7

(51) Int. Cl.
*G01B 21/20* (2006.01)

(52) U.S. Cl. .......................... 702/95; 702/168; 700/61; 700/186; 33/503

(58) Field of Classification Search .................. 700/56, 700/61, 63, 66, 67, 69, 159, 176, 184, 186, 700/188, 190, 193; 702/95, 168; 33/503, 33/556, 561

See application file for complete search history.

(56) References Cited

U.S. PATENT DOCUMENTS

| 5,189,806 | A | * | 3/1993 | McMurtry et al. ............. 33/503 |
| 5,222,034 | A | * | 6/1993 | Shelton et al. ............... 702/152 |
| 5,517,190 | A | * | 5/1996 | Gunn ........................... 33/561 |
| 5,675,902 | A | * | 10/1997 | Chase .......................... 33/559 |
| 5,726,917 | A | | 3/1998 | Staaden |
| 6,154,713 | A | * | 11/2000 | Peter et al. ..................... 702/95 |
| 6,158,136 | A | * | 12/2000 | Gotz et al. .................... 33/503 |
| 6,307,084 | B1 | * | 10/2001 | Matsuki et al. ............... 33/503 |
| 6,460,261 | B1 | * | 10/2002 | Noda et al. ................... 33/503 |
| 6,868,356 | B2 | * | 3/2005 | Nai et al. ...................... 702/95 |
| 7,395,606 | B2 | * | 7/2008 | Crampton .................... 33/503 |
| 7,420,588 | B2 | * | 9/2008 | Asano et al. .................. 348/94 |
| 7,456,538 | B2 | * | 11/2008 | Nai et al. ..................... 310/114 |
| 7,533,574 | B2 | * | 5/2009 | McMurtry et al. ............ 73/763 |

FOREIGN PATENT DOCUMENTS

| DE | 100 50 795 A1 | 7/2001 |
| WO | WO 90/07097 | 6/1990 |

* cited by examiner

*Primary Examiner*—Charles R Kasenge
(74) *Attorney, Agent, or Firm*—Oliff & Berridge, PLC

(57) ABSTRACT

A method for planning the trajectory of an apparatus, such as an articulating probe head, mounted on a coordinate positioning apparatus, such as a CMM. It is determined whether for a given trajectory, the angular velocity or acceleration of the apparatus about a rotational axis of the apparatus will exceed a predetermined threshold. If so, parameters are adjusted so that the angular velocity or acceleration do not exceed the threshold.

20 Claims, 19 Drawing Sheets

Scan w.r.t. CMM origin: X-Y plane

Scan w.r.t. CMM origin: X-Z plane

A1 position

A2 position

A1 velocity

A2 velocity

A1 acceleration

A2 acceleration

Scan w.r.t. CMM origin: X-Y plane

Scan w.r.t. CMM origin: X-Z plane

A1 position

A2 position

A1 velocity

A2 velocity

A1 acceleration

A2 acceleration

Scan w.r.t. CMM origin: X-Y plane

Scan w.r.t. CMM origin: X-Z plane

A1 position

A2 position

A1 velocity

A2 velocity

A1 acceleration

A2 acceleration

Scan w.r.t. CMM origin: X-Y plane

Scan w.r.t. CMM origin: X-Z plane

A1 position

A2 position

A1 velocity

A2 velocity

A1 acceleration

A2 acceleration

Scan w.r.t. CMM origin: X-Y plane

Scan w.r.t. CMM origin: X-Z plane

A1 position

A2 position

A1 velocity

A2 velocity

A1 acceleration

A2 acceleration

Scan w.r.t. CMM origin: X-Y plane

Scan w.r.t. CMM origin: X-Z plane

A1 position

A2 position

A1 velocity

A2 velocity

A1 acceleration

A2 acceleration

Scan w.r.t. CMM origin: X-Y plane

Scan w.r.t. CMM origin: X-Z plane

A1 position

A2 position

A1 velocity

A2 velocity

A2 acceleration

METHOD OF PATH PLANNING

The present invention relates to a method of scanning the surface of a workpiece using a motorised scanning head mounted on a coordinate positioning apparatus such as a coordinate measuring machine (CMM), machine tool, manual coordinate measuring arms and inspection robots.

It is known from International Patent Application No. WO90/07097 to mount a motorised scanning head on a coordinate positioning machine. The motorised scanning head enables a stylus mounted on the motorised scanning head to be rotated about two orthogonal axes. Thus the stylus may be positioned angularly about these two axes whilst the motorised scanning head can be positioned by the coordinate positioning machine in any position within the working volume of the machine.

Such a motorised scanning head provides a coordinate positioning machine with greater scanning flexibility because the motorised scanning head can position the stylus in many different orientations.

WO90/07097 discloses that such a motorised scanning head mounted on a coordinate positioning machine is suitable for use in scanning surface profiles such as bores. This is done by using the coordinate positioning machine to move the motorised scanning head along the nominal centreline of the surface profile. The scanning head moves the stylus tip around the surface profile by rotating about one or both of the orthogonal axes. However, a product of this nature is not commercially available.

This is a simple procedure for most surface profiles. However we have discovered that for scans during which the angle of the stylus is such that it becomes substantially parallel to one of the rotational axes, hereinafter referred to as the "critical angle", discontinuities in the scanning head's angular motion result from this scanning method. These discontinuities are caused by a requirement for an infinite rotational velocity about the one axis and a step change in rotational velocity about the other axis resulting in infinite angular accelerations about both these axes. Similarly for scans of profiles where the angle of the stylus comes close to this critical angle, rapid changes in the scanning head's angular motion result in near infinite angular accelerations. As such motions cannot be achieved it is physically impossible to scan surface profiles which will result in the stylus being oriented at or near the critical angle using the method described above.

The term 'critical angle problem' is used to refer to a problem due to one or more angular values (velocity and acceleration about A1 nd A2) being greater than a permitted value. Hence the term refers to scans which require the probe to be at some point where there are discontinuities in the scanning head's angular motion and to scans which require the probe to move close enough to the critical angle for one of the angular values to exceed that which is permitted for the scan (usually due to a hardware limitation).

As already stated when scanning a profile with a centre line, the scanning head is normally moved along the centre line. However, it has been found that for certain orientations of the profile, the critical angle may be encountered. Such orientations will hereinafter be referred to as the 'critical angle orientation'.

A first aspect of the present invention provides a method for planning the trajectory of an apparatus mounted on a coordinate positioning apparatus, wherein the coordinate positioning apparatus may be operated to produce relative movement between the apparatus and a surface of the coordinate positioning apparatus and wherein the apparatus includes a drive for producing rotational movement about two or more axes, the method comprising the steps of:

determining whether for a given trajectory, the angular velocity or acceleration of the apparatus about a rotational axis of the apparatus will exceed a predetermined threshold;

and if so, adjusting the parameters so that the angular velocity or acceleration of the apparatus about said rotational axis does not exceed said predetermined threshold.

Said apparatus may comprise a probe head. A surface sensing device may be mounted on said probe head.

The step of adjusting the parameters may comprise choosing a new trajectory so that the rotational velocity or acceleration of the apparatus about said rotational axis is below said threshold. The new trajectory may be offset parallel to the previous trajectory.

In a preferred embodiment, the apparatus is a probe head with a surface sensing device mounted thereon and wherein the previous trajectory is the nominal centre line of a surface profile to be measured by said surface sensing device and said new trajectory is offset parallel to said centre line.

The step of adjusting the parameters may comprise reorientating the surface profile and/or changing the angular velocity of the device mounted on the apparatus.

The apparatus may comprise a probe head with a probe mounted thereon, the probe having a stylus, wherein the step of adjusting the scan parameters may comprise changing the stylus length. Alternatively, the apparatus may comprise a probe head with a non contact probe mounted thereon, wherein the step of adjusting the scan parameters may comprise changing the offset of the non contact probe.

The probe head moves the surface sensing device by driving it to demanded position points nominally on a surface profile and the gaps between these points may be chosen so that angular velocity or acceleration of the probe head about said rotational axis does not exceed said predetermined threshold.

A second aspect of the present invention provides apparatus for planning the trajectory of an apparatus mounted on a coordinate positioning apparatus, wherein the coordinate positioning apparatus may be operated to produce relative movement between the apparatus and a surface of the coordinate positioning apparatus and wherein the apparatus includes a drive for producing rotational movement about two or more axes, the apparatus comprising a computing device to perform the steps of:

determining whether for a given trajectory, the angular velocity or acceleration of the apparatus about a rotational axis of the apparatus will exceed a predetermined threshold;

and if so, adjusting the parameters so that the angular velocity or acceleration of the apparatus about said rotational axis does not exceed said predetermined threshold.

A third aspect of the present invention provides a method for measuring a surface profile using a surface detecting device mounted on a probe head on a coordinate positioning apparatus, wherein the coordinate positioning apparatus may be operated to produce relative movement between the probe head and the surface profile along a trajectory and wherein the probe head includes a drive for producing rotational movement of the surface detecting device about two or more axes, such that the drive may be operated to position the surface detecting device relative to the surface of the surface profile to enable measurements to be taken around the surface profile, the method comprising the steps of:

determining whether for a given trajectory, the angular velocity or acceleration of the probe head about a rotational axis of the probe will exceed a predetermined threshold;

and if so, adjusting the scan parameters so that the angular velocity or acceleration of the probe head about said rotational axis does not exceed said predetermined threshold.

A fourth aspect of the present invention provides a method for measuring a surface profile using a surface detecting device mounted on a probe head on a coordinate positioning apparatus, wherein the coordinate positioning apparatus may be operated to produce relative movement between the probe head and the surface profile along a trajectory and wherein the probe head includes a drive for producing rotational movement of the surface detecting device about two or more axes, such that the drive may be operated to position the surface detecting device relative to the surface of the surface profile to enable measurements to be taken around the surface profile, the method comprising the steps of:

determining whether for a given trajectory, a longitudinal axis of the surface detecting device will become parallel or substantially parallel to a rotational axis of the probe head;

and if so, choosing a new trajectory, such that the longitudinal axis of the surface detecting device will not become parallel or substantially parallel to a rotational axis of the probe head.

The surface sensing device may comprise a probe with a probe tip and wherein the longitudinal axis of the surface sensing device extends from the probe tip to an axis of the probe head, said longitudinal axis being normal to said axis of the probe head.

This method is suitable for a multi-axis probe head, such as a 3-axis probe head in which the trajectory is chosen to prevent the surface detecting device from becoming parallel to any of the rotational axes of the probe head during the scan.

Examples of preferred embodiments of the invention will now be described with reference to the accompanying drawings wherein.

Figure 1:
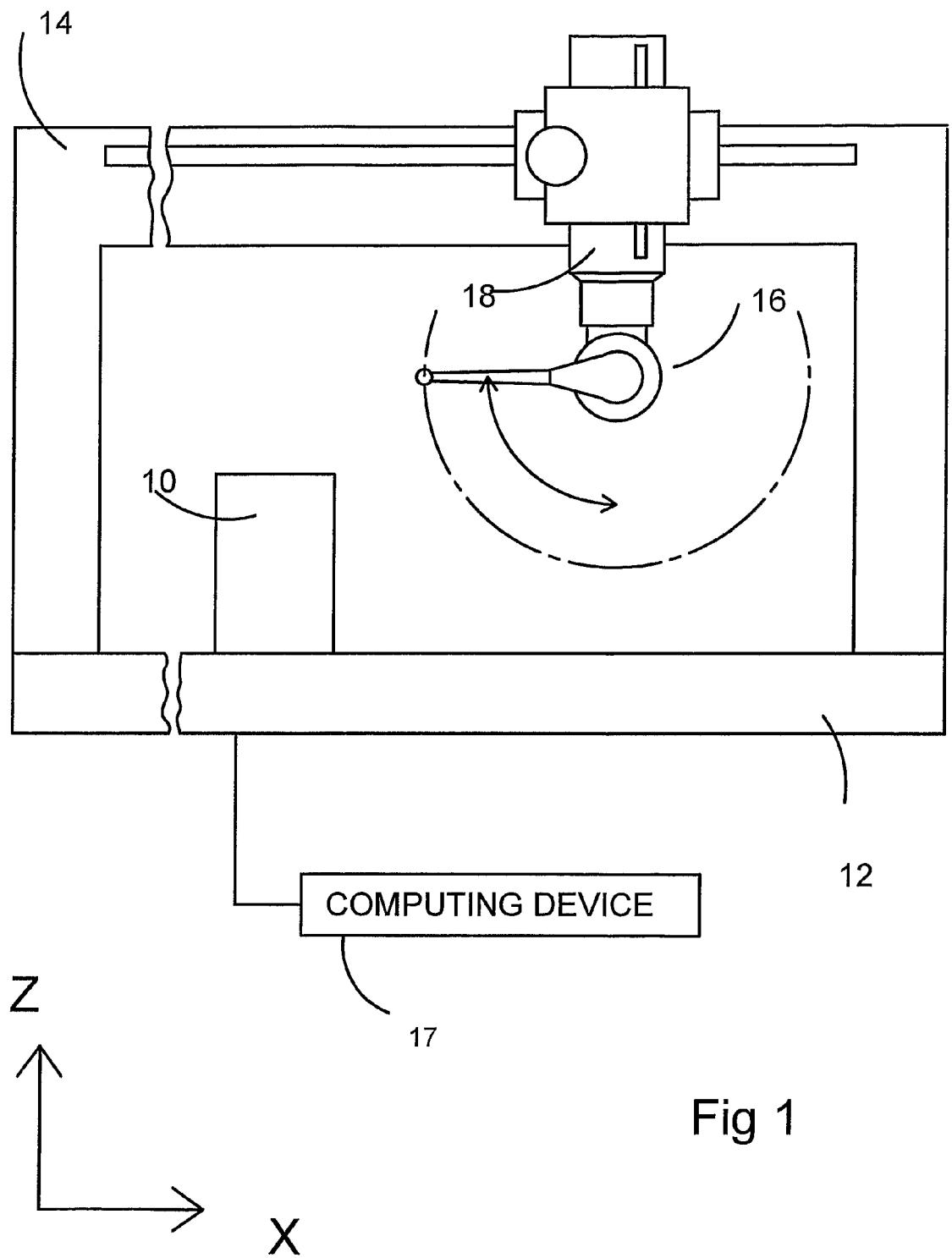
FIG. 1 is an elevation of a coordinate measuring machine including scanning apparatus according to the present invention.

FIG. 1 illustrates a motorised scanning head mounted on a coordinate measuring machine (CMM). A workpiece 10 to be measured is mounted on a table 12 of the CMM 14 and a motorised scanning head 16 is mounted on a spindle 18 of the CMM 14. The spindle is driveable in the directions X,Y,Z relative to the table by motors in known manner.

Figure 2:
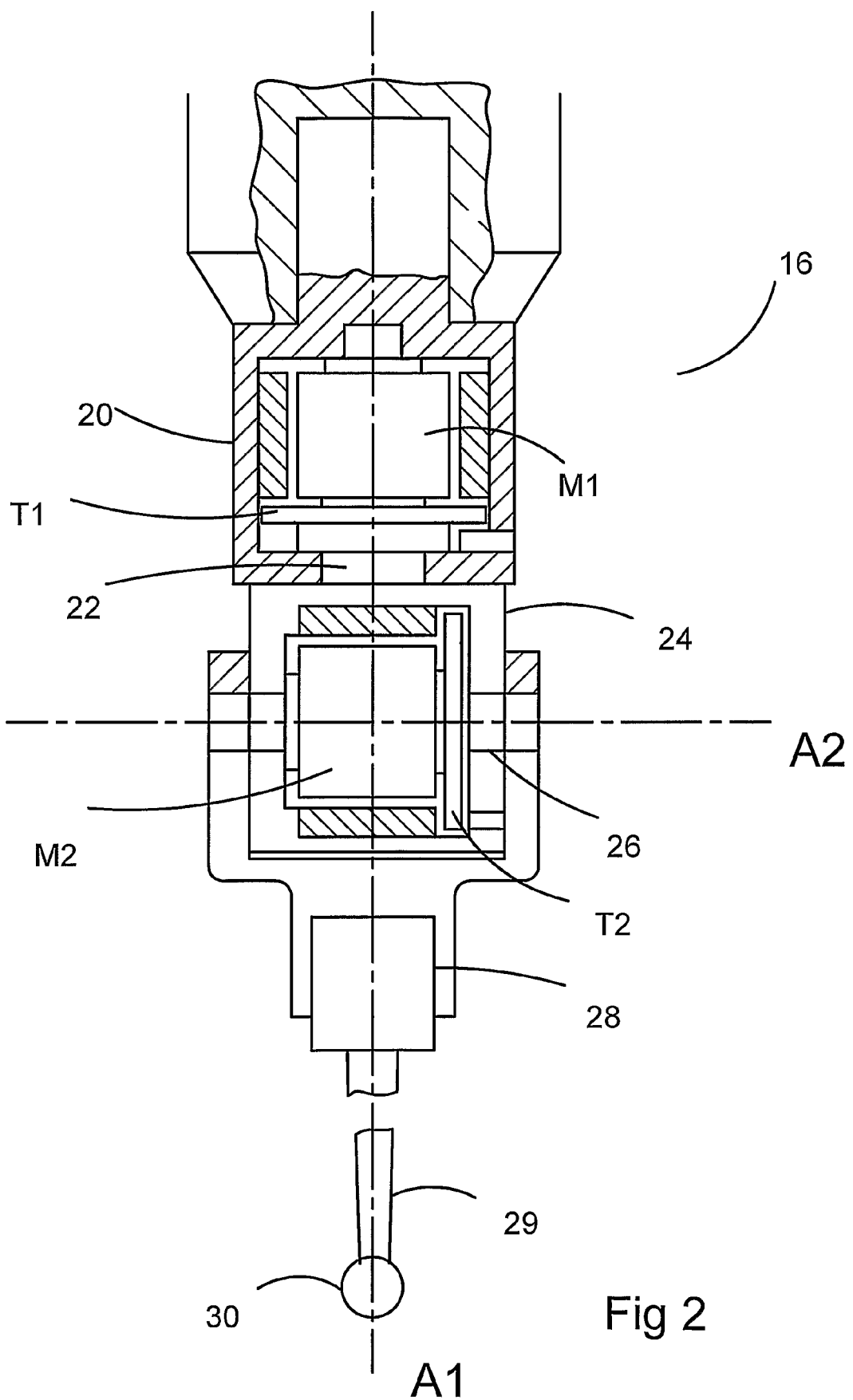
FIG. 2 is a cross-section of a motorised scanning head.

As illustrated in FIG. 2, the motorised scanning head 16 comprises a fixed part formed by a base or housing 20 supporting a movable part in the form of a shaft 22 rotatable by a motor M1 relative to the housing 20 about an axis A1. The shaft 22 is secured to a further housing 24 which in turn supports a shaft 26 rotatable by a motor M2 relative to the housing 24 about an axis A2 perpendicular to the axis A1.

A probe 28 with a stylus 29 having a workpiece-contacting tip 30 is mounted onto the motorised scanning head. The arrangement is such that the motors M1,M2 of the head can position the workpiece-contacting tip angularly about the axes A1 or A2 and the motors of the CMM can position the motorised scanning head linearly anywhere within the three-dimensional coordinate framework of the CMM to bring the stylus tip into a predetermined relationship with the surface being scanned.

Linear position transducers are provided on the CMM for measuring linear displacement of the scanning head and angular position transducers T1 and T2 are provided in the scanning head for measuring angular displacement of the stylus about the respective axes A1 and A2.

On a vertical arm CMM as shown in FIG. 1, the A1 axis of the scanning head 16 is nominally parallel to the CMM Z axis (which is along the spindle 18). The scanning head may rotate the probe continuously about this axis.

The A2 axis of the scanning head is orthogonal to its A1 axis.

The system is provided with a computing device 17 such as a dedicated controller of the CMM or a separate computer. This contains a program to control motion of the CMM and/or probe head. This or a different controller may be used for the calculations required in the methods described below.

This apparatus is suitable for scanning surface profiles, in particular those having a centre line, such as bores. This is usually done by moving the spindle of the CMM and thus the scanning head along the nominal centreline of the surface profile whilst the scanning head moves the stylus tip around the surface of the bore. This method takes advantage of the fact that rotary movement of the scanning head about the A1 and A2 axes is more responsive than linear motion of the CMM spindle about the X,Y and Z linear axes.

Figure 3:
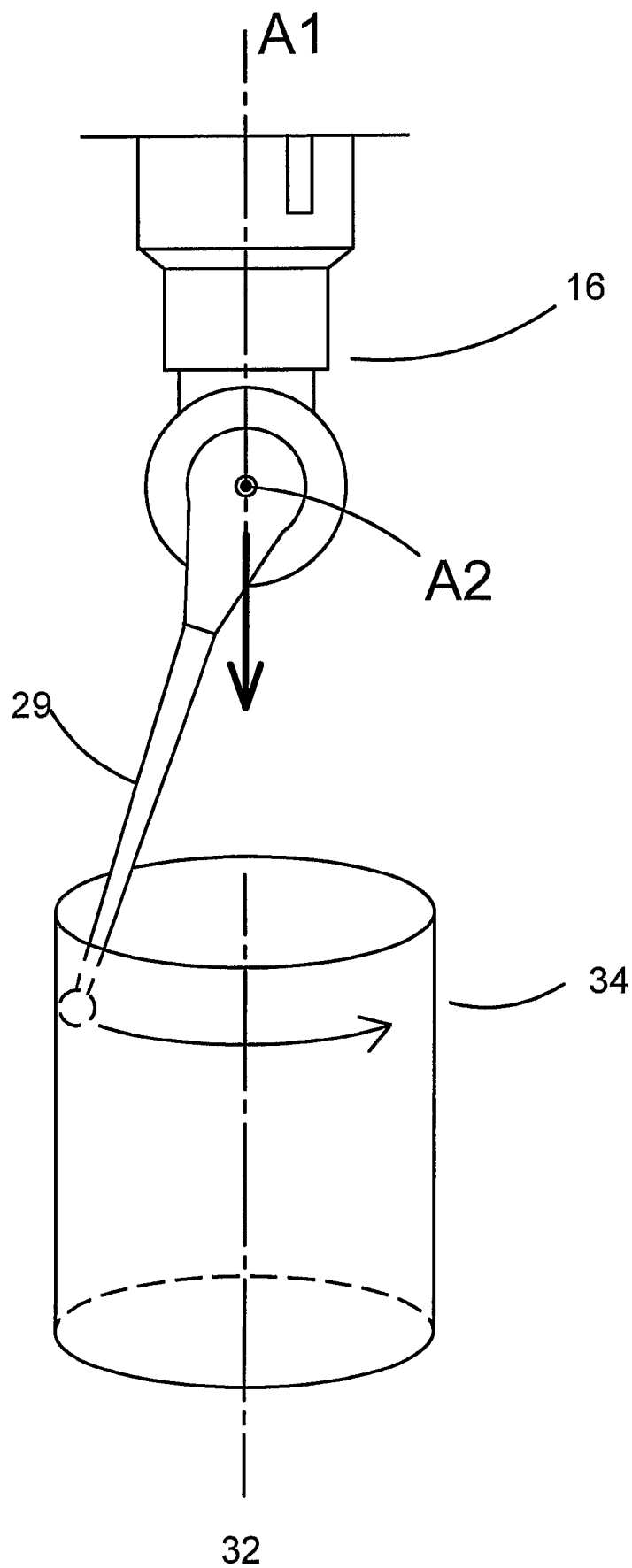
FIG. 3 illustrates a vertical bore being scanned.
Figure 4A:
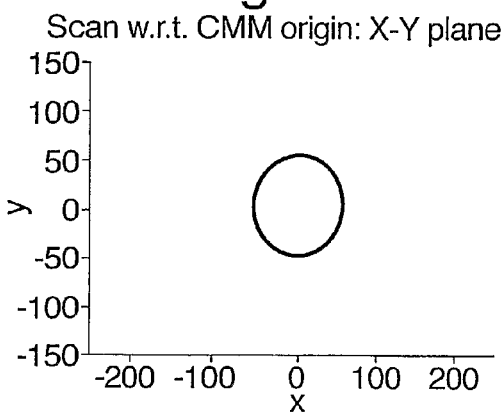
FIGS. 4A and 4B illustrate the scan profile in the XY and YZ plane respectively for a vertical bore.
Figure 4B:
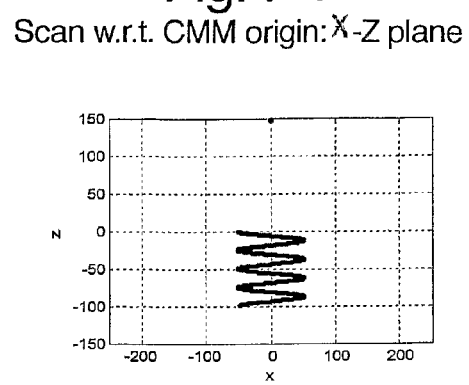

Scanning of a vertical bore will now be described with reference to FIG. 3. Here, the scanning head 16 is moved by the CMM spindle along the nominal centre line 32 of the bore 34. The scanning head 16 rotates the stylus 29 continuously about the A1 axis whilst the stylus is kept at a nominally constant angle about the A2 axis to keep the probe on the surface of the bore. However in reality, the angle of the stylus about the A2 axis may vary slightly to maintain a steady probe deflection (or probe force). FIGS. 4A and 4B illustrate the scan profile on the XY plane and the YZ plane respectively.

Figure 4C:
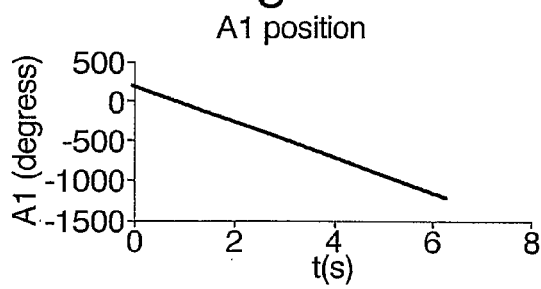
FIGS. 4C and 4D illustrate the stylus tip position about the A1 and A2 axes respectively during the scan of a vertical bore.
Figure 4D:
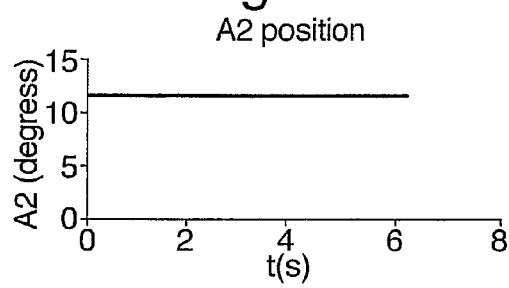
Figure 4E:
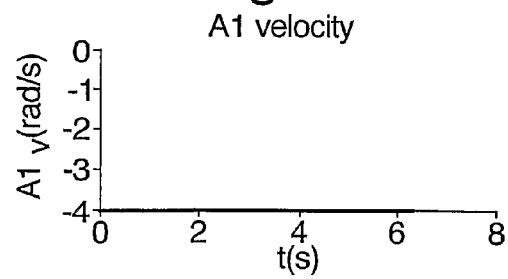
FIGS. 4E and 4F illustrate the stylus tip velocity about the A1 and A2 axes respectively during the scan of a vertical bore.
Figure 4F:
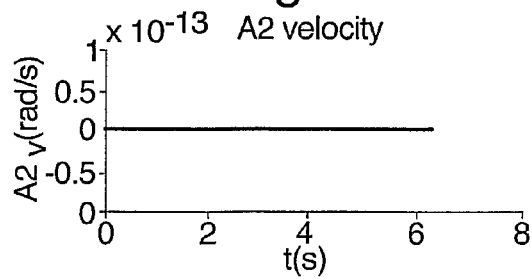
Figure 4G:
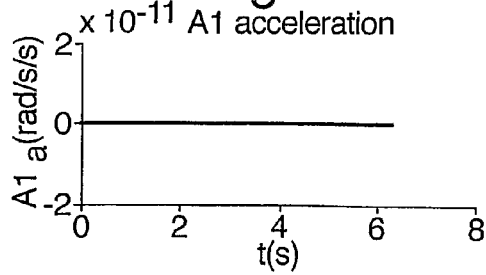
FIGS. 4G and 4H illustrate the stylus tip acceleration about the A1 and A2 axes respectively during the scan of a vertical bore.
Figure 4H:
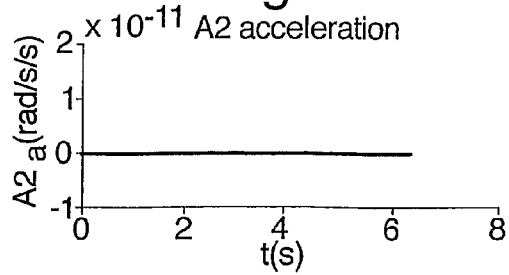

FIGS. 4C and 4D illustrate the position of the stylus tip about the A1 and A2 axes respectively over time. FIG. 4C shows the angle of the stylus tip about axis A1 varying linearly over time whereas FIG. 4D shows the angle of the stylus tip about the A2 axis remaining constant. FIGS. 4E and 4F show the speed of the stylus tip about the A1 axis and A2 axis respectively. FIG. 4E shows the stylus tip moving about the A1 axis at a constant velocity whereas FIG. 4F shows that velocity about the A2 axis remains at zero. FIGS. 4G and 4H illustrate the acceleration of the stylus tip about the A1 and A2 axes respectively. In both cases there is zero acceleration.

Figure 5:
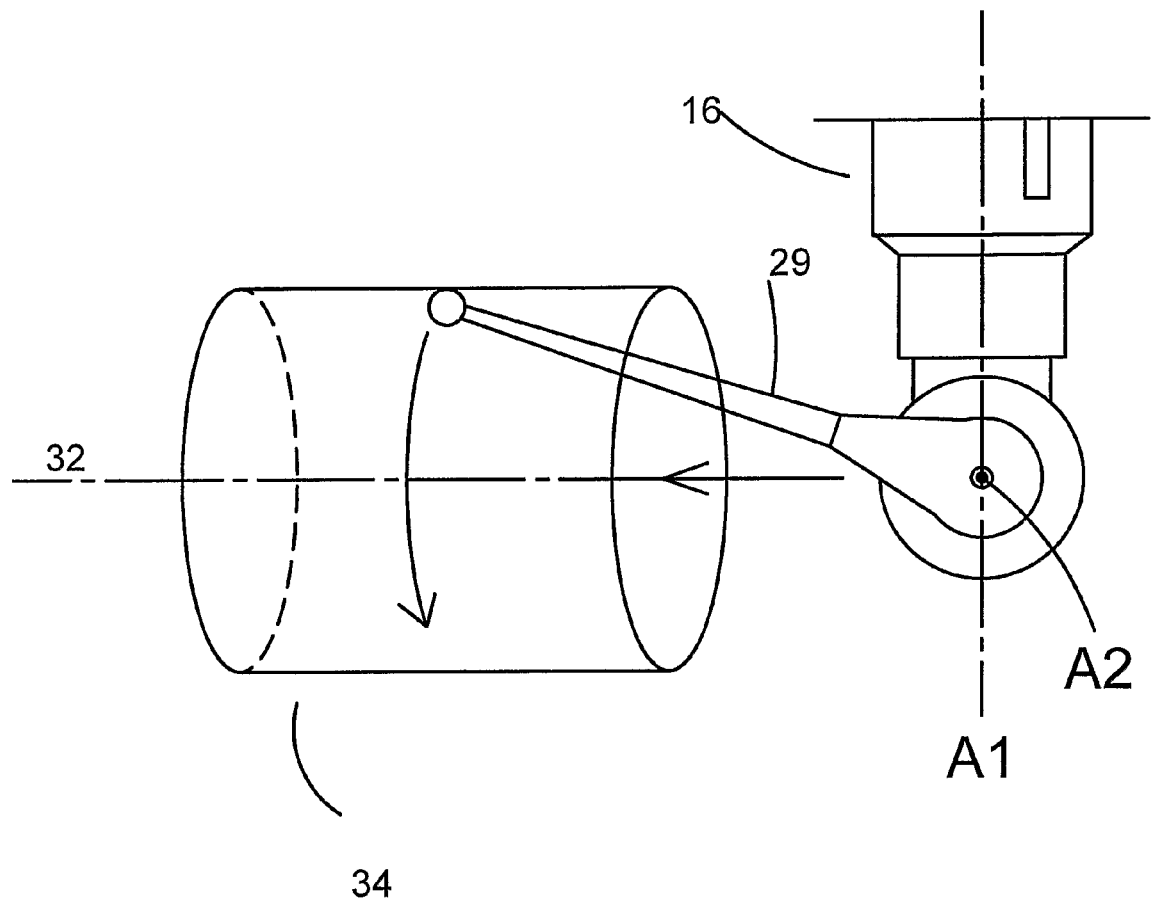
FIG. 5 illustrates a horizontal bore being scanned.
Figure 6A:
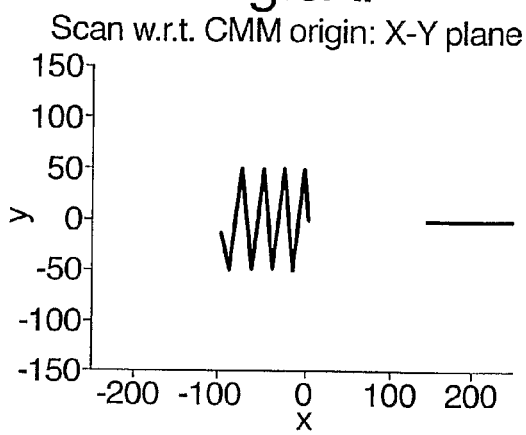
FIGS. 6A and 6B illustrate the scan profile in the XY and YZ planes respectively for a horizontal bore.
Figure 6B:
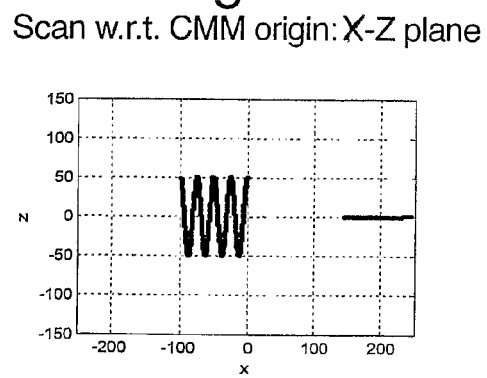

FIG. 5 relates to the method of scanning a horizontal bore. As described above, the scanning head 16 is moved by the CMM spindle, along the nominal centre line 32 of the bore 34. In this case the position of the stylus tip about both the A1 and A2 axes is modulated to keep the stylus tip on the surface of the bore and thereby maintain a steady probe deflection. FIGS. 6A and 6B show the scan profile on the XY plane and the YZ plane respectively.

Figure 6C:
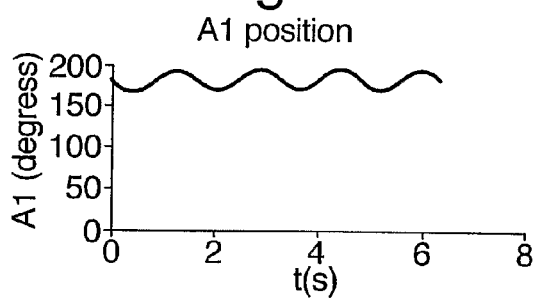
FIGS. 6C and 6D illustrate the stylus tip position about the A1 and A2 axes respectively during the scan of a horizontal bore.
Figure 6D:
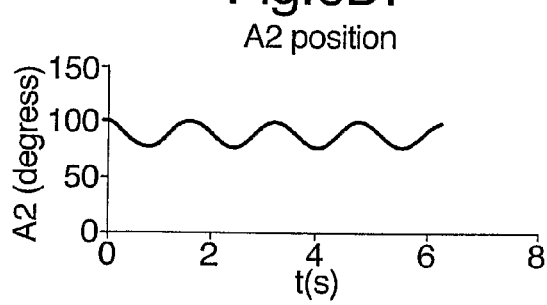
Figure 6E:
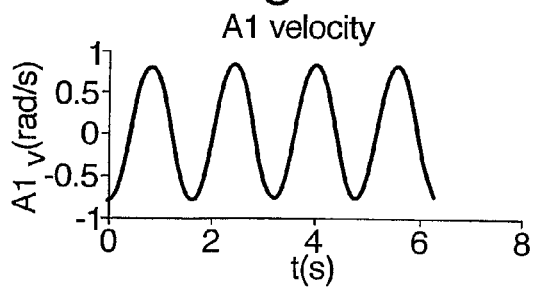
FIGS. 6E and 6F illustrate the stylus tip velocity about the A1 and A2 axes respectively during the scan of a horizontal bore.
Figure 6F:
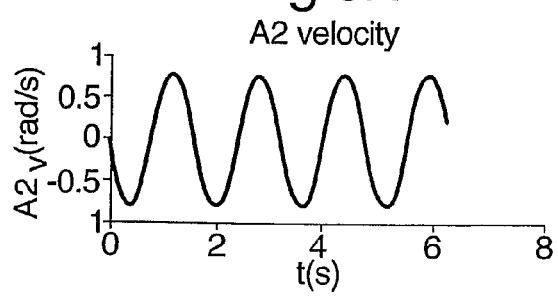
Figure 6G:
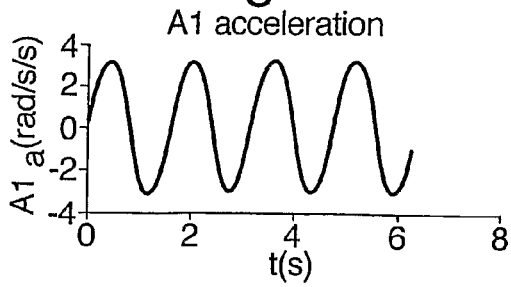
FIGS. 6G and 6H illustrate the stylus tip acceleration about the A1 and A2 axes respectively during the scan of a vertical bore.
Figure 6H:
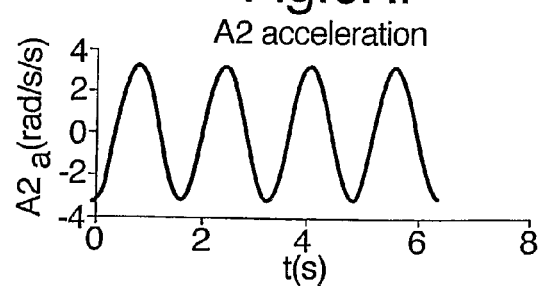

FIGS. 6C and 6D illustrate the stylus tip position about the A1 axis and A2 axis respectively. In both cases the position of the scanning head can be seen to be modulated. FIGS. 6E and 6F illustrate the velocity of the stylus tip about the A1 and A2 axes respectively. In both cases the velocity is modulated. FIGS. 6G and 6H illustrate the acceleration of the stylus tip about the A1 and A2 axes respectively. The acceleration of the stylus tip is modulated about both axes.

Figure 7:
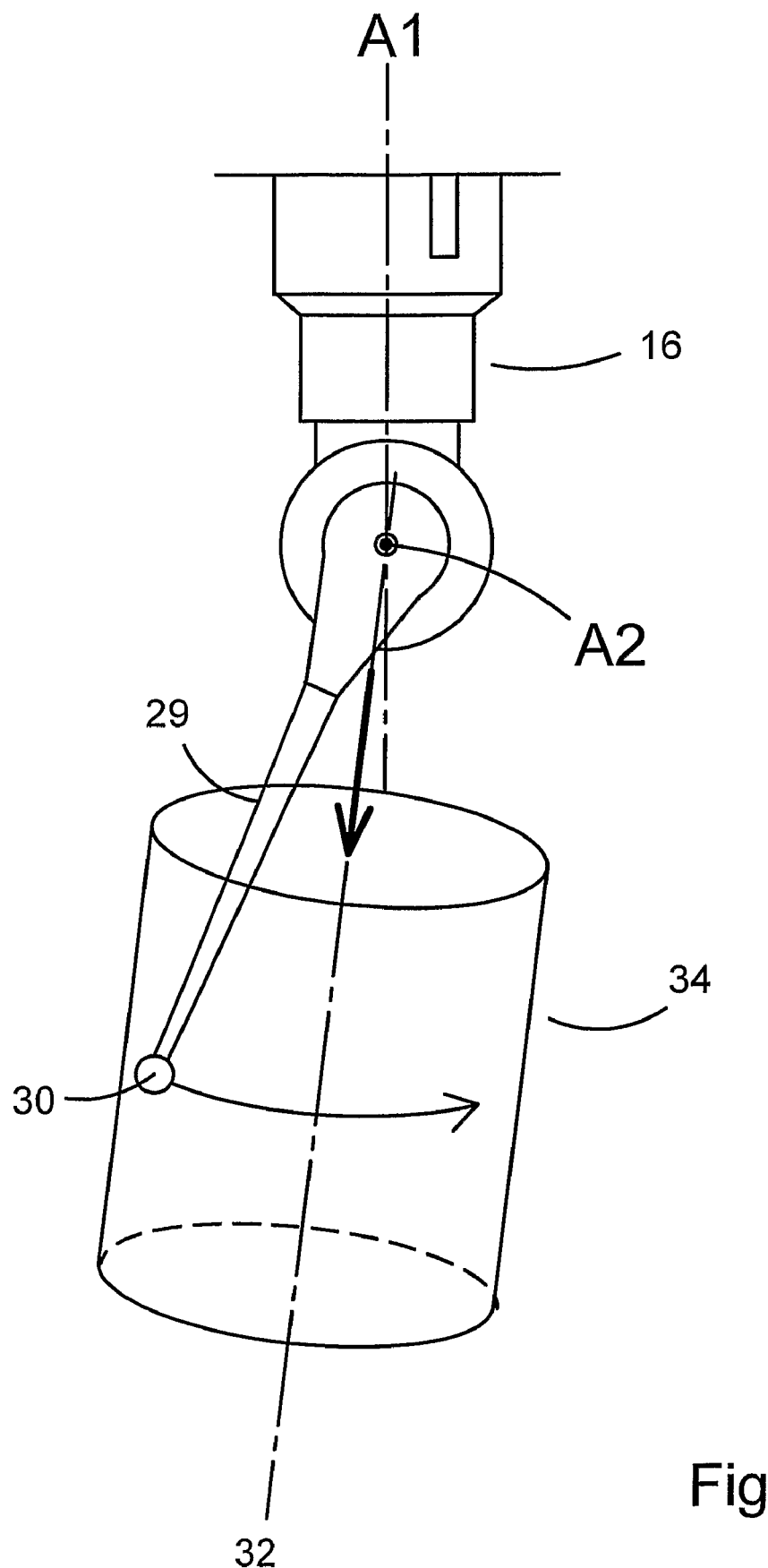
FIG. 7 illustrates a near vertical bore being scanned.
Figure 8A:
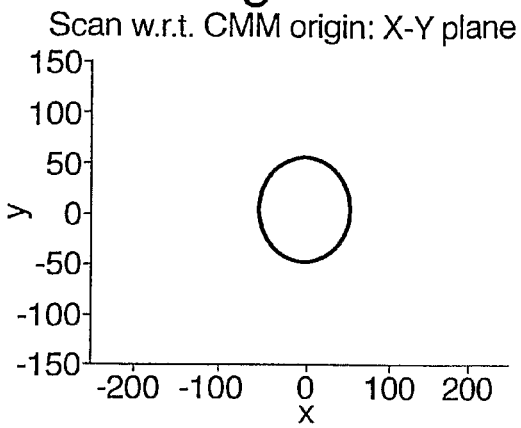
FIGS. 8A and 8B illustrate the scan profile in the XY and YZ plane respectively for a near vertical bore.
Figure 8B:
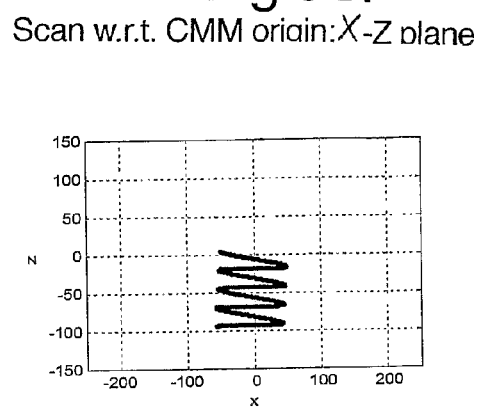

Scanning of a near vertical bore will now be described with reference to FIG. 7. As before the scanning head 16 is moved by the CMM spindle along the bore's nominal centre line 32. The stylus tip 30 is rotated continuously about the A1 axes and is modulated about both the A1 and A2 axes to keep the stylus tip on the surface of the bore, thus maintaining a steady probe deflection. FIGS. 8A and 8B illustrate the scan profile in the XY plane and the YZ plane respectively.

Figure 8C:
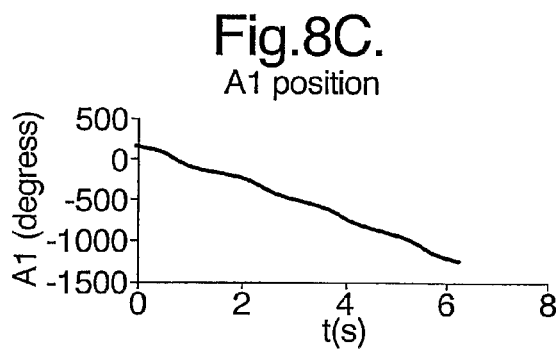
FIGS. 8C and 8D illustrate the stylus tip position about the A1 and A2 axes respectively during the scan of a near vertical bore.
Figure 8D:
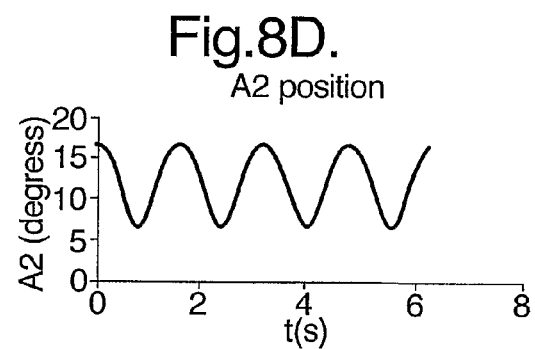
Figure 8E:
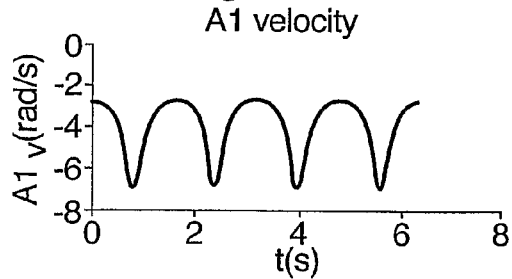
FIGS. 8E and 8F illustrate the stylus tip velocity about the A1 and A2 axes respectively during the scan of a near vertical bore.
Figure 8F:
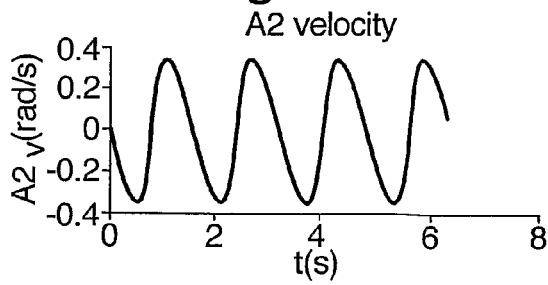
Figure 8G:
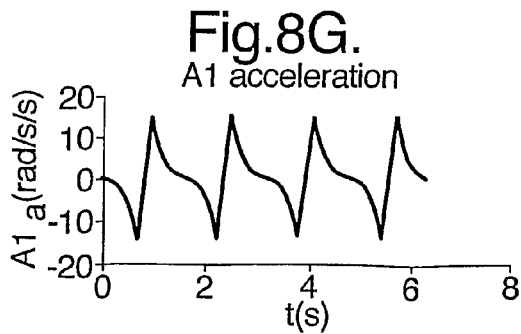
FIGS. 8G and 8H illustrate the stylus tip acceleration about the A1 and A2 axes respectively during the scan of a near vertical bore.
Figure 8H:
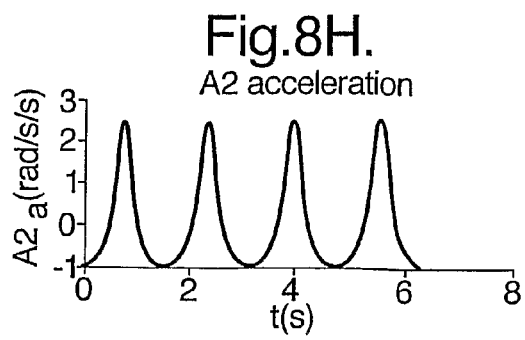

FIGS. 8C and 8D illustrate the position of the stylus tip about the A1 and A2 axes respectively. FIG. 8C shows the stylus tip being rotated about the A1 axis with some modulation occurring whilst FIG. 8D shows the stylus tip being modulated about the A2 axis. FIGS. 8E and 8F illustrate the velocity of the stylus tip about the A1 and A2 axes respectively. FIGS. 8G and 8H show the acceleration of the stylus tip about the A1 and A2 axes respectively.

Figure 9:
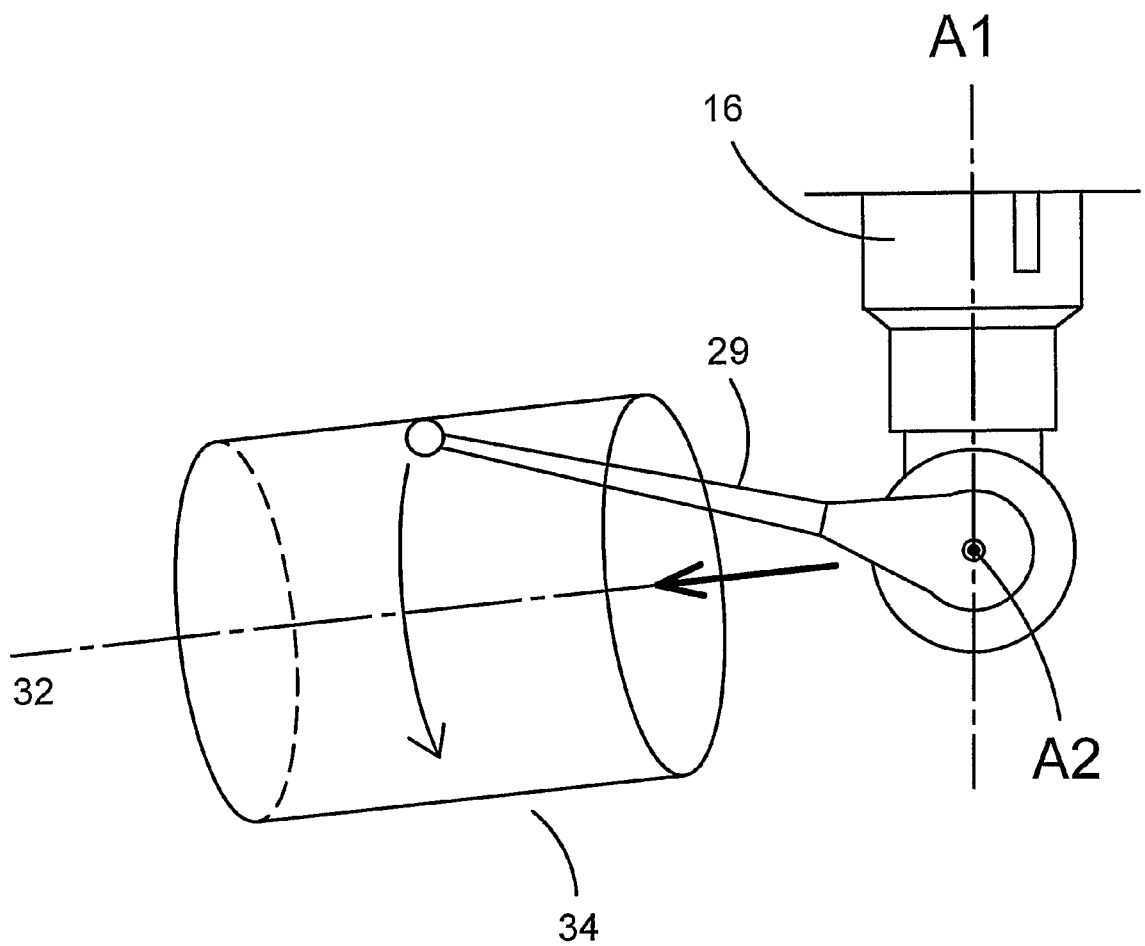
FIG. 9 illustrates a near horizontal bore being scanned.
Figure 10A:
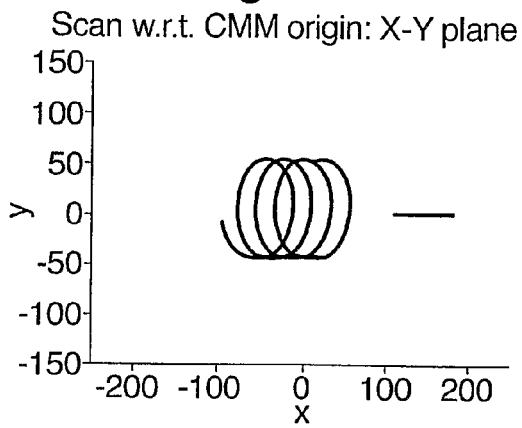
FIGS. 10A and 10B illustrate the scan profile in the XY and YZ planes respectively for a near horizontal bore.
Figure 10B:
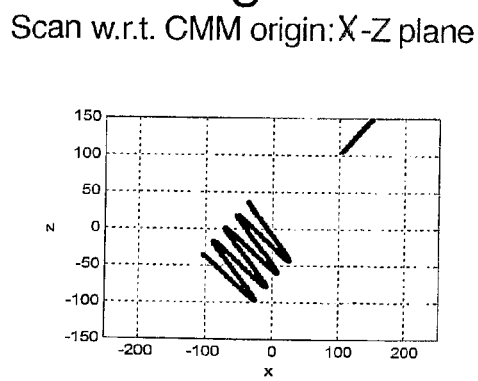

FIG. 9 illustrates a scan of a near horizontal bore. As before the scanning head 16 is moved by the CMM spindle along the nominal centreline 32 of the bore 34. FIGS. 10A and 10B illustrate the scan profile in the XY and YZ planes respectively.

Figure 10C:
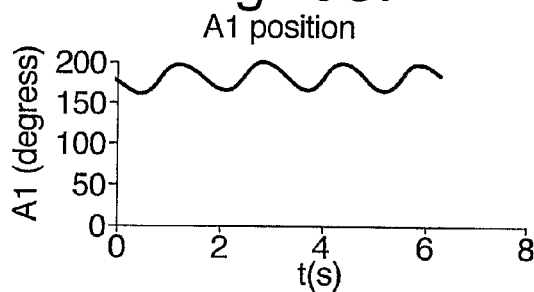
FIGS. 10C and 10D illustrate the stylus tip position about the A1 and A2 axes respectively during the scan of a near horizontal bore.
Figure 10D:
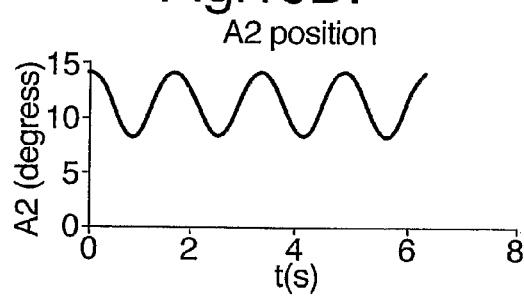
Figure 10E:
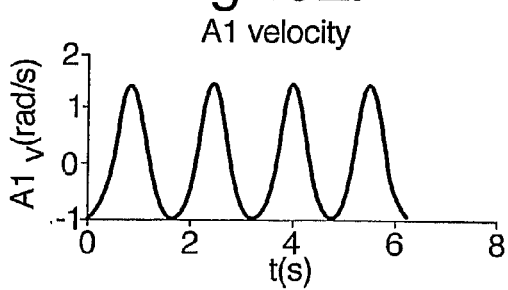
FIGS. 10E and 10F illustrate the stylus tip velocity about the A1 and A2 axes respectively during the scan of a near horizontal bore.
Figure 10F:
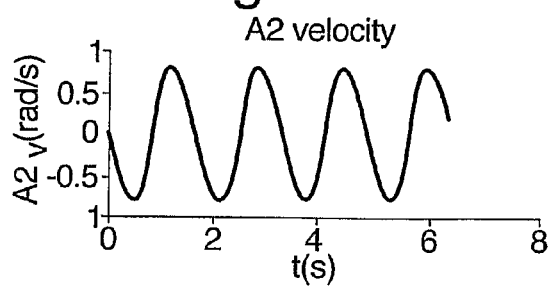
Figure 10G:
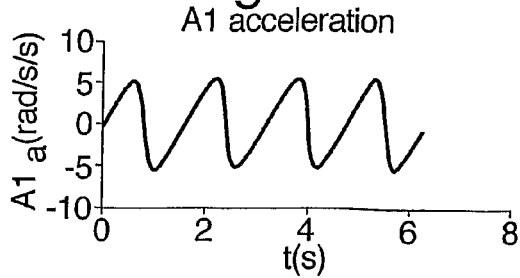
FIGS. 10G and 10H illustrate the stylus tip acceleration about the A1 and A2 axes respectively during the scan of a near horizontal bore.
Figure 10H:
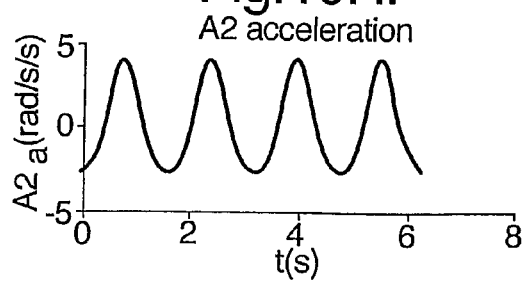

As shown in FIGS. 10C and 10D, the stylus tip is modulated about both the A1 and A2 axes to keep the probe on the surface of the bore and maintain the probe deflection. FIGS. 10E and 10F illustrate the velocity of the stylus tip modulating about the A1 and A2 axes respectively. FIGS. 10G and 10H illustrate the acceleration of the stylus tip modulating about the A1 and A2 axes respectively.

As discussed above, when scanning near vertical bores the stylus tip is required to rotate about the A1 axis continuously whilst being modulated about the A2 axis. When scanning near horizontal bores the stylus tip is required to be modulated about both the A1 and A2 axis. A bore may be orientated in a whole range of angles from near vertical to near horizontal. However at a particular bore angle the motion of the stylus tip about the A1 axis switches from continuous rotation to being modulated. This bore angle is referred to as the critical angle orientation.

During the scan of a bore angled at this critical angle orientation, the stylus tip passes through an angle of 0° about the A2 axis relative to the A1 axis. As the stylus tip passes through this angle, the stylus becomes parallel to the A1 axis.

This results in discontinuities in the scanning head's angular motion resulting in an infinite rotational velocity of the stylus tip about the A1 axis and step changes in its rotational velocity about the A2 axis thus causing infinite angular accelerations about the A1 and A2 axes. Similarly, for bores angled close to the critical angle orientation rapid changes in the scanning head's angular motion result in near infinite angular accelerations. Such motion cannot be achieved and it is thus physically impossible to scan bores orientated at or near the critical angle orientation using the method described above.

The system may have a cranked stylus or a probe/stylus offset along the A2 axis. In this case, the critical angle problem relates to a line extending from the A2 axis to the stylus tip, which is normal to the A2 axis, becoming parallel or close to parallel to the A1 axis.

Figure 11:
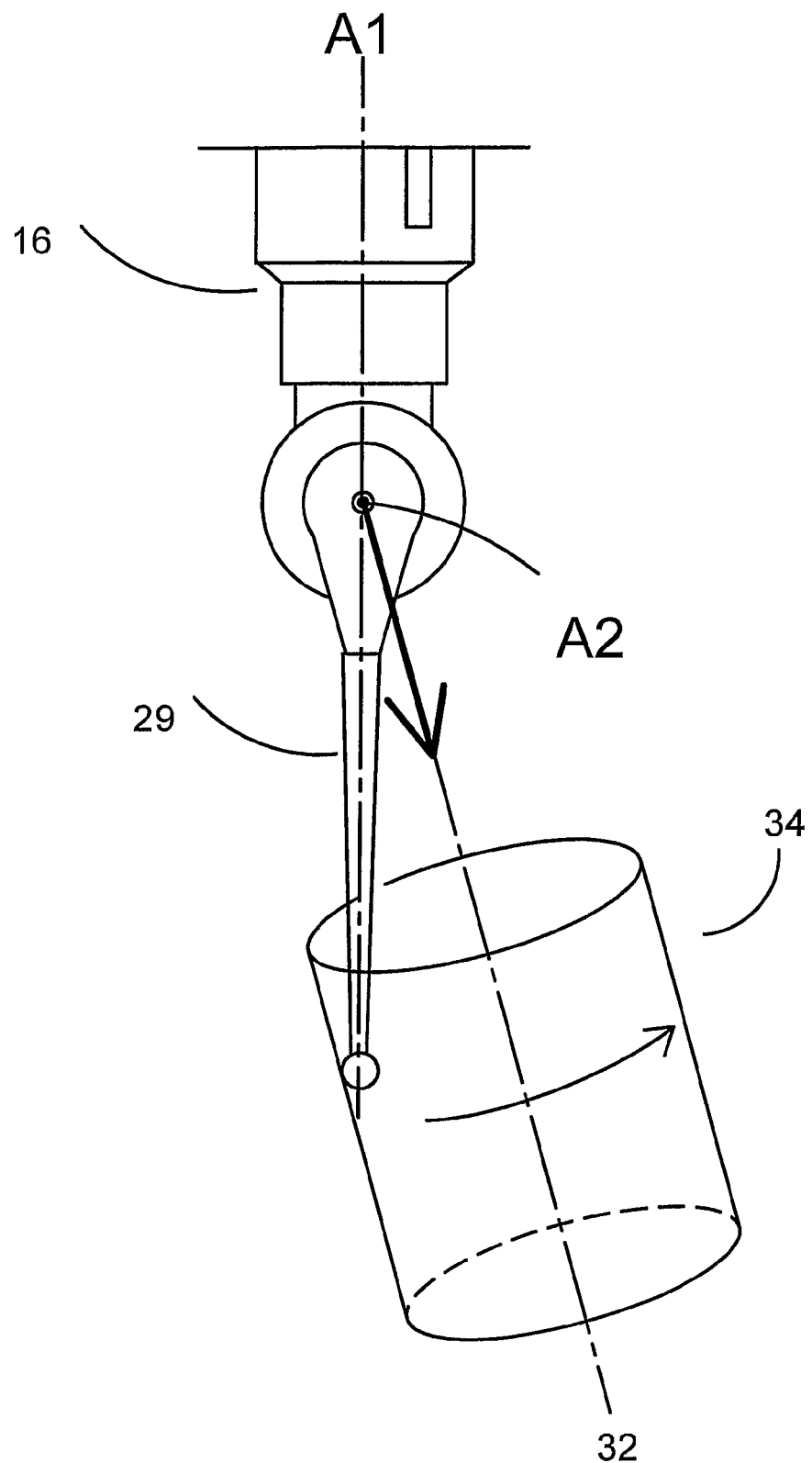
FIG. 11 illustrates a bore angled at a critical angle orientation being scanned by moving the scanning head along the nominal centre line.

FIG. 11 illustrates a bore being scanned which is orientated at the critical angle orientation. At the point in the scan illustrated in FIG. 11, the scanning head 16 is positioned such that the stylus is parallel to the A1 rotational axis of the scanning head. As the stylus passes through this position, step changes in the stylus position about the A1 axis and the velocity about the A2 axis result.

Figure 12A:
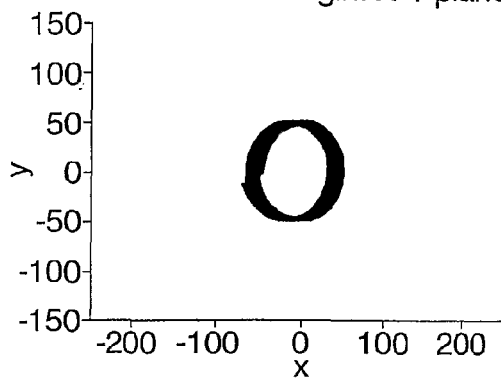
FIGS. 12A and 12B illustrate the scan profile in the XY and YZ planes respectively for a bore angled at fractionally less than the critical angle orientation.
Figure 12B:
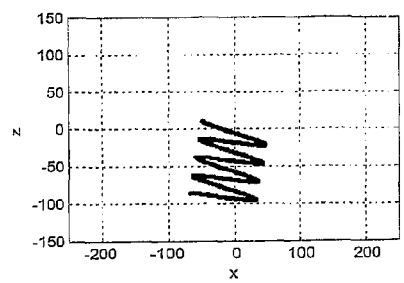
Figure 12C:
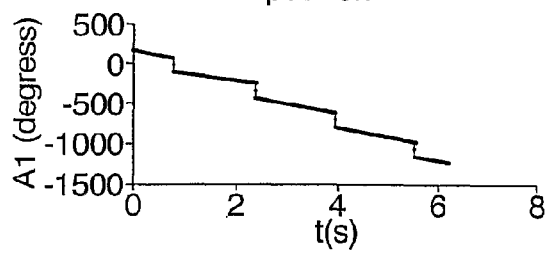
FIGS. 12C and 12D illustrate the stylus tip position about the A1 and A2 axes respectively during the scan of a bore angled at fractionally less than the critical angle orientation.
Figure 12D:
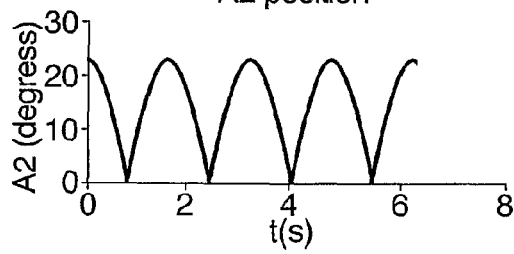

FIGS. 12A to 12G illustrate a scan of a bore angled at fractionally less than the critical angle orientation. FIGS. 12A and 12B show the scan profile in the XY and YZ planes respectively. The stylus tip position about the A1 and A2 axes are shown in FIGS. 12C and 12D respectively. Step changes in the position of the stylus tip about the A1 axis can be seen in FIG. 12C.

Figure 12E:
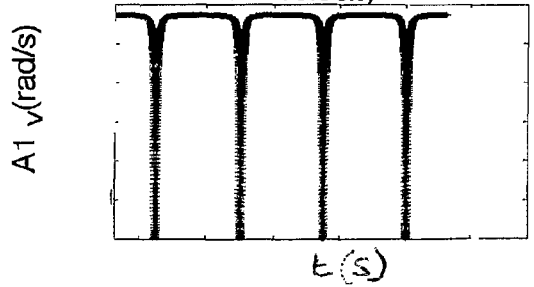
FIGS. 12E and 12F illustrate the stylus tip velocity about the A1 and A2 axes respectively during the scan of a bore angled at fractionally less than the critical angle orientation.
Figure 12F:
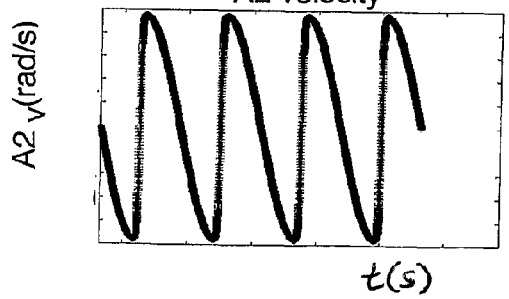

FIGS. 12E and 12F illustrate the velocity of the stylus tip about the A1 and A2 axes respectively. FIG. 12F illustrates the step changes in stylus tip velocity about the A2 axis and FIG. 12E illustrates the stylus tip velocity required about the A1 axis tending towards infinity.

Figure 12G:
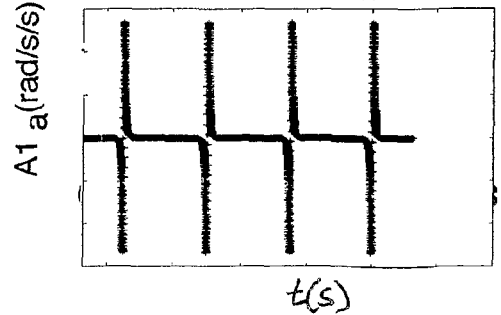
FIGS. 12G and 12H illustrate the stylus tip acceleration about the A1 and A2 axes respectively during the scan of a bore angled at fractionally less than the critical angle orientation.
Figure 12H:
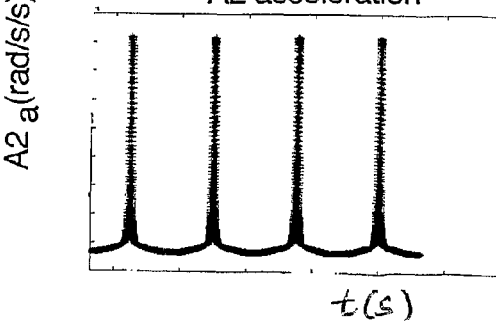

FIGS. 12G and 12H illustrate the acceleration of the stylus tip about the A1 and A2 axes respectively. In both Figures, stylus tip accelerations that tend towards infinity are shown.

Figure 13A:
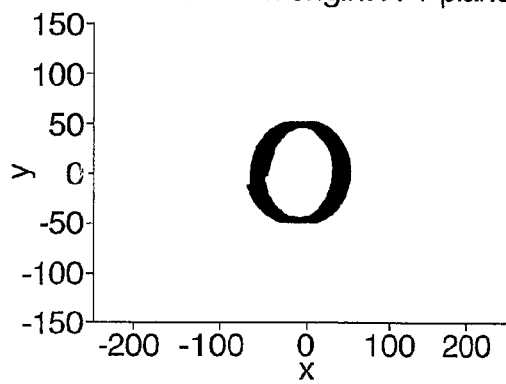
FIGS. 13A and 13B illustrate the scan profile in the XY and YZ planes respectively for a bore angled at fractionally more than the critical angle orientation.
Figure 13B:
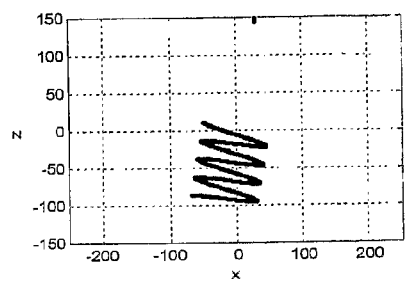
Figure 13C:
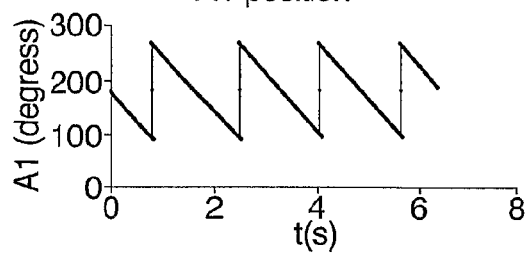
FIGS. 13C and 13D illustrate the stylus tip position about the A1 and A2 axes respectively during the scan of a bore angled at fractionally more than the critical angle orientation.
Figure 13D:
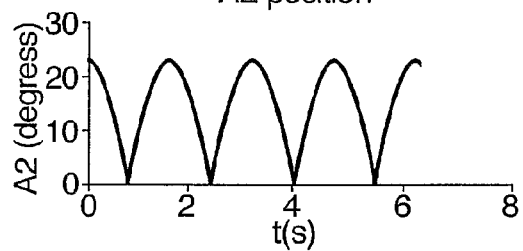

FIGS. 13A-13G illustrate a scan of a bore angled at fractionally more than the critical angle orientation. FIGS. 13A and 13B show the scan profile in the XY and YZ planes respectively. The stylus tip positions about the A1 and A2 axes are shown in FIGS. 13C and 13D respectively. As before, step changes in the position of the stylus tip about the A1 axis can be seen in FIG. 13C.

Figure 13E:
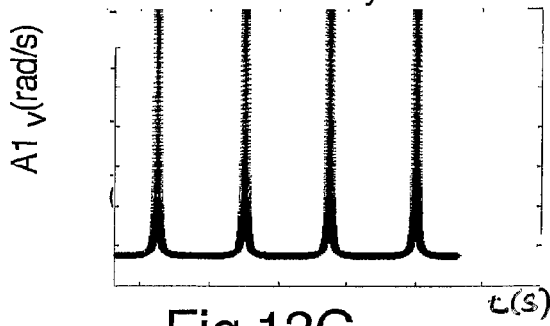
FIGS. 13E and 13F illustrate the stylus tip velocity about the A1 and A2 axes respectively during the scan of a bore angled at fractionally more than the critical angle orientation.
Figure 13F:
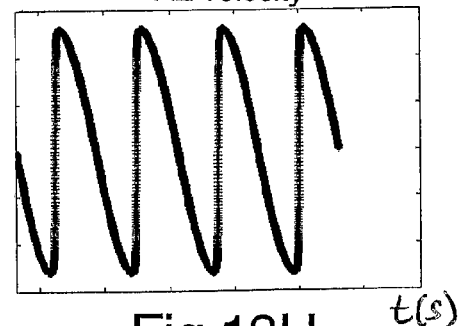

FIGS. 13E and 13F illustrate the velocity of the stylus tip about the A1 and A2 axes respectively. FIG. 13F illustrates step changes in the stylus tip velocity about the A2 axis and FIG. 13E illustrates the stylus tip velocity required about the A1 axis tending towards infinity.

Figure 13G:
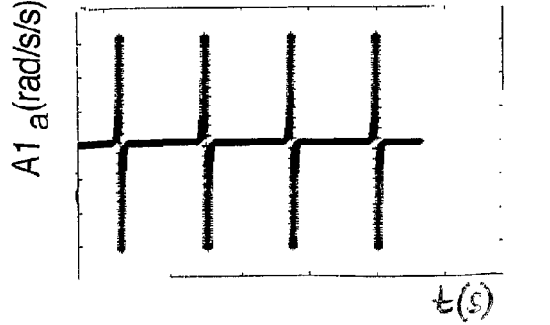
FIGS. 13G and 13H illustrate the stylus tip acceleration about the A1 and A2 axes respectively during the scan of a bore angled at fractionally more than the critical angle orientation.
Figure 13H:
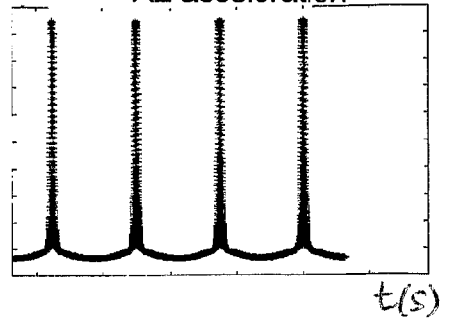

FIGS. 13G and 13H illustrate the acceleration of the stylus tip about the A1 and A2 axes respectively. In both Figures, stylus tip accelerations that tend towards infinity are shown.

The critical angle problem occurs because the motorised scanning head has upper limits of the rotational velocity about the A1 axis and accelerations about the A1 and A2 axes. When a bore is orientated at this critical angle orientation, a rotational velocity and/or accelerations about the A1 and/or A2 axes are/is required which exceeds the upper limit of the motorised scanning head.

In order to identify whether critical angle orientation counter measures need to be taken it is necessary to determine whether a limit of the angular velocity about the A1 axis and/or the accelerations about the A1 and/or A2 axes will be exceeded. It may also be determined whether a critical angle problem occurs by determining whether a position demand occurs which requires the stylus to become substantially parallel to the A1 axis.

A technique for predicting the critical angle problem using the velocity and acceleration scan parameters is outlined below, using a bore as an example.

The magnitudes of angular velocity $V_{A1}$, angular acceleration $A_{A1}$ and Jerk $J_{A1}$ (rate of change of acceleration) about the A1 axis can be determined for any point on the scan from the following equations.

$$V_{A1} = \frac{\omega \sin\phi(\cos\phi\sin\theta\cos(\omega t) - \sin\phi\cos\theta)}{(\cos\phi\sin\theta - \sin\phi\cos\theta\cos(\omega t))^2 + \sin^2\phi\sin^2(\omega t)} \quad (1)$$

$$A_{A1} = \frac{a\sin(\omega t)(b\cos^2(\omega t) - c\cos(\omega t) + d)}{(f^2\cos^2(\omega t) + 2g\cos(\omega t) + h)^2} \quad (2)$$

$$J_{A1} = \frac{\begin{bmatrix} a\omega\omega(3b \cdot co^3(\omega\omega t + 2c \cdot \cos^2(\omega\omega t + k \cdot \\ \cos(w \cdot c + c)(f^2\cos^2(\omega\omega t + 2g \cdot \cos(\omega g \cdot + h)^2 + \\ 4a\omega a\omega \cdot s^2(\omega\omega t)(b \cdot co^2(\omega\omega t + c \cdot \cos(\omega \cdot \\ c + d)(f^4 \cdot \cos^3(\omega\omega t + m \cdot \\ \cos^2(\omega\omega t + n \cdot \cos(\omega \cdot c + p) \end{bmatrix}}{(f^2 \cdot \cos^2(wt) + 2g \cdot \cos(wt) + h)^4} \quad (3)$$

where $\omega$: Angular velocity of scan (i.e.: of tip in scan plane) [radians/sec]

$\phi$: Angle subtended about the (A1, A2) axis intersection by the bore radius. [Units irrelevant as always used in trigonometric functions.]

$\theta$: Bore elevation. [Units irrelevant as always used in trigonometric functions.]

t: Time since scan began [seconds]. Zero is at closest point to A1 axis.

And where the constants in equations (1), (2) and (3) are defined as follows:

$a = -\omega^2 \sin\phi \sin\theta$ $b = \sin^2\phi(\cos\phi\sin^2\theta + \cos\phi - 1)$ $c = 2\sin^3\phi\sin\theta\cos\theta$ $d = \cos^3\phi\sin^2\theta - 2\sin^2\phi\cos\phi\cos^2\theta + \sin^2\phi$ $f = \sin\phi\sin\theta$ $g = \sin\phi\cos\phi\sin\theta\cos\theta$ $h = \cos^2\phi\cos^2\theta - 1$ $k = 3\sin^2\phi - 4\sin^2\phi\cos\phi + \cos^3\phi\sin^2\theta$ $m = 3\sin^3\phi\cos\phi\sin^3\theta\cos\theta$ $n = \sin^2\phi\sin^2\theta(3\cos^2\phi\cos^2\theta - 1)$ $p = \sin\phi\cos\phi\sin\theta\cos\theta(\cos^2\phi\cos^2\theta - 1)$ The magnitudes of angular velocity $V_{A2}$, angular acceleration $A_{A2}$ and Jerk $J_{A2}$ about the A2 axis can be determined for any point on the scan from the following equations.

$$V_{A2} = \frac{\omega\sin\phi\sin\theta\sin(\omega t)}{(1 - (\cos\phi\cos\theta + \sin\phi\sin\theta\cos(\omega t))^2)^{0.5}} \quad (4)$$

$$A_{A2} = \frac{a(g\cos^2(\omega t) + q\cos(\omega t) + g)}{(1 - (r + f\cos(\omega t))^2)^{1.5}} \quad (5)$$

$$J_{A2} = \frac{\begin{bmatrix} -a\omega\sin(\omega t)[(2g\cos(\omega t) + q)(1 - (r + f\cos(\omega t))^2) + \\ 3f(g\cos^2(\omega t) + q\cos(\omega t) + g)(r + f\cos(\omega t))] \end{bmatrix}}{(1 - (r + f\cos(\omega t))^2)^{2.5}} \quad (6)$$

Where the constants in equations (4), (5) and (6) are as per the constants in equations (1), (2) and (3) and also defined as follows:

$q = \sin^2\phi \sin^2\theta + \cos^2\phi \cos^2\theta - 1$ $r = \cos\phi \cos\theta$ These equations describe the entire scan rather than only the maximum magnitude. However, the equations can be used to determine the maximum magnitude of each of the predicted velocity about A1, acceleration about A1, velocity about A2 and acceleration about A2 for a required scanning scenario. These maximum values are compared with the maximum values permitted for a required scenario. If the magnitude of any of these predicted values exceeds the magnitude of the corresponding permitted value, then the scan is close enough to the critical angle to be a problem. If not, then no critical angle problem exists and the scan can proceed.

As mentioned above, the equations above can be used to derive the maximum magnitudes of angular velocity and acceleration about A1 and A2. These are found as follows:

$$V_{A1Max} = \frac{\omega\sin\phi}{\sin(\theta - \phi)} \quad \{\theta \neq \phi\} \quad (7)$$

This result is positive for $\theta > \phi$ and negative for $\theta < \phi$. At $\theta = \phi$ the critical angle case occurs and $V = \infty$.

$A_{A1MAX}$ cannot be found directly from an equation (no algebraic solution currently exists) and so it must be found iteratively from equation (2) above.

$V_{A2MAX}$ occurs when $\cos(\omega t)$ is given by the following expression:

$$\cos(\omega t) = \frac{(1 - \sin^2\phi\sin^2\theta - \cos^2\phi\cos^2\theta) \pm (\cos^2\phi - \cos^2\theta)}{2\sin\phi\cos\phi\sin\theta\cos\theta} \quad (8)$$

The positive case should be used when $\theta \leq \phi$, the negative case when $\theta \geq \phi$. (Outside these ranges $|\cos(\omega t)| > 1$.) The resulting value of $\cos(\omega t)$ corresponds to two values of t during one complete scan revolution (i.e.: when $\omega t \in [0, 2\pi[$). When substituted into the equation (4) for $V_{A2}$ these give the maximum and minimum values of $V_{A2}$ angular velocity.

It is not anticipated that $V_{A2MAX}$ will normally tend to infinity as the critical angle is approached during a scan.

$$A_{A2Max} = \frac{\omega^2 \sin\phi\sin\theta}{\sin(\theta - \phi)} \quad \{\theta \neq \phi\} \quad (9)$$

This result is always positive. At $\theta = \phi$ the critical angle orientation case occurs and $A_{A2MAX} = \infty$.

These equations describe a bore having specific scan parameters. These are as follows: the bore axis should lie in the plane in which A1 is zero and time is measured such that it is zero at the tip's closest point to the A1 axis. Any scan which does not involve these specific parameters can be modified (e.g. using rotation of axes, adding a constant to measure time etc) such that the constant features become true for that scan. Bore elevations of 0 to 90° degrees are supported by these equations.

The implications of the bore's parameters on the angular velocity around the A1 axis will now be examined, to illustrate the effect of the critical angle. The angular velocity $\omega$ about the axis A1 required for scanning a bore, whilst moving the scanning head along the centre line, is calculated using the equation below:

$$\omega = \frac{V}{2\Pi \left| \sqrt{L^2 - r^2} \sin\theta - r\cos\theta \right|} \quad (10)$$

where, $\omega$=maximum rotational velocity about the A1 axis [revs per second]
V=stylus tip speed [mm per second]
L=probe length [mm]
r=bore radius [mm]
$\theta$=bore elevation [units irrelevant as always implied by trigonometric functions]

Figure 14:
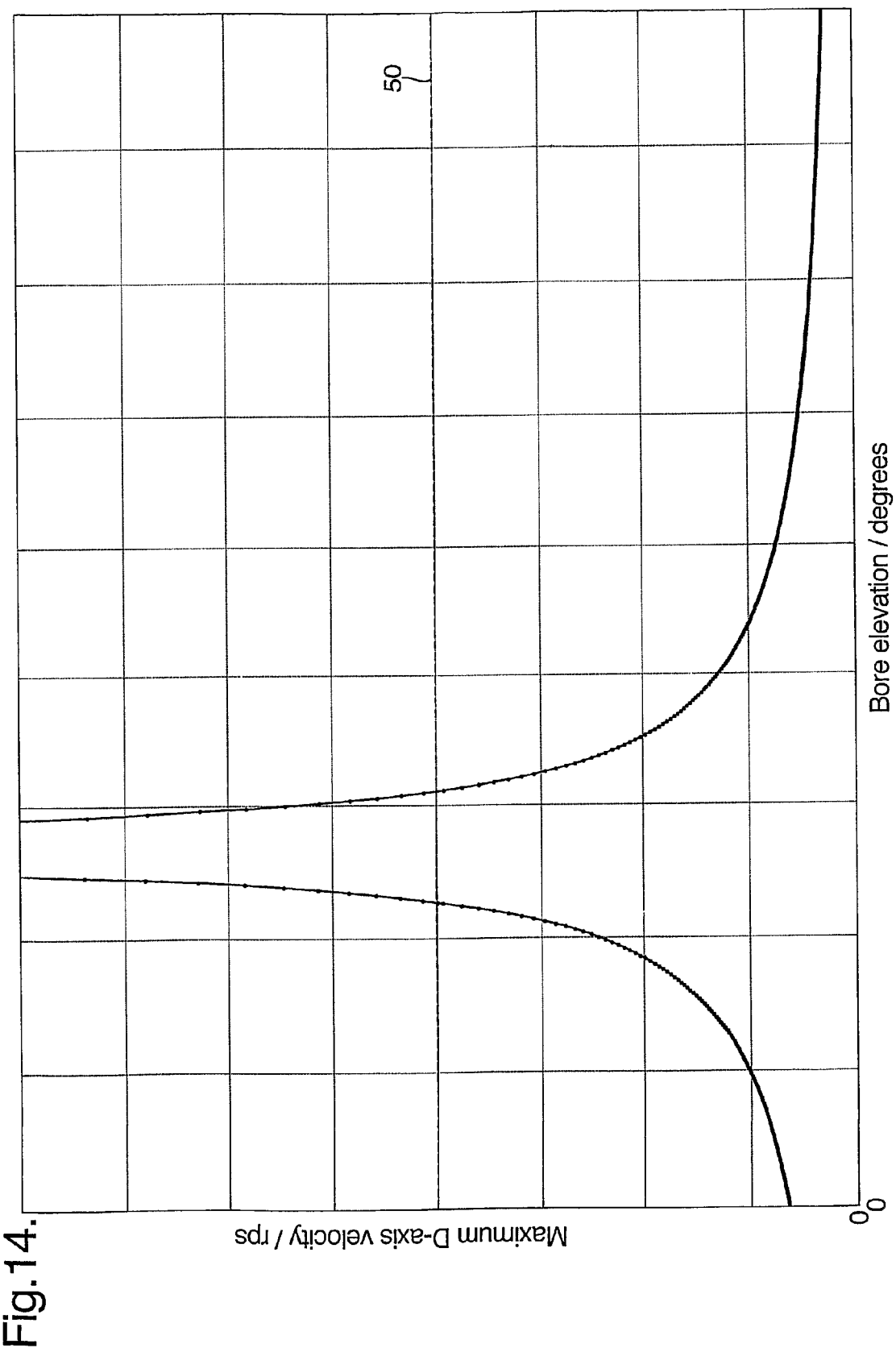
FIG. 14 is a graph of maximum rotational velocity about the A1 axis against bore elevation.

FIG. 14 is a graph of the maximum rotational velocity about the A1 axis against the bore elevation, for a given bore radius, stylus tip speed, probe length, and moving the scanning head along the bore axis. Dashed line 50 illustrates the upper limit of rotational velocity about the A1 axis for the motorised scanning head. It can be seen that for certain bore elevations, a maximum angular velocity about the A1 axis is required which exceeds the upper limit shown by line 50. Thus the scan cannot be done at this bore elevation using the current scan parameters.

For a given bore radius, probe length and stylus tip speed, it can be determined at what bore elevations a scan may be carried out using the current scan profile. These allowable bore elevations may be calculated from the equations below, which are derived from equation (10) above:

$$\theta \geq \sin^{-1}\left(\frac{V}{L}\right) + \sin^{-1}\left(\frac{V}{2\Pi \cdot L \cdot \omega\max}\right) \quad (11)$$

$$\theta \leq \sin^{-1}\left(\frac{r}{L}\right) - \sin^{-1}\left(\frac{V}{2\Pi \cdot L \cdot \omega\max}\right) \quad (12)$$

where $\omega$max–maximum rotational velocity about the A1 axis.

Figure 15:
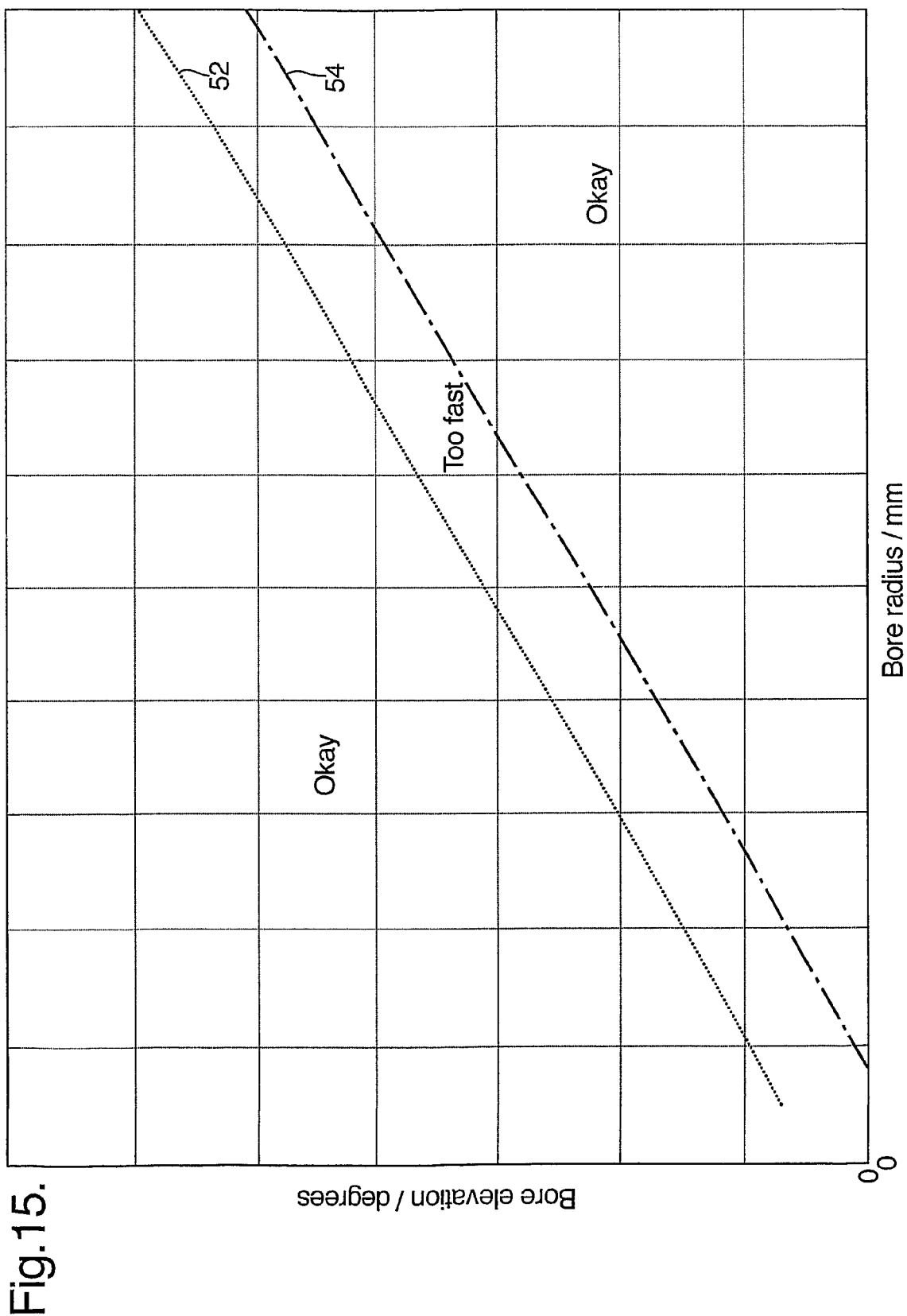
FIG. 15 is a graph of bore elevation against bore radius.

FIG. 15 shows a graph of bore elevation against bore radius for a scan of a bore along its centre line using a defined stylus tip speed, probe length and maximum rotational velocity about the A1 axis. The lines 52 and 54 show the limits respectively above and below which scans may be done using the scan profile. In the region between lines 52 and 54, the critical angle problem exists and the bore cannot be scanned using the scan profile.

The equations (1)-(12) above may also be modified to take account of stylus tip diameter for a contact probe and offset for a non contact probe.

There are several different methods by which it can be determined whether a critical angle problem will exist for a scan of any particular part. Firstly, it can be determined whether the demanded angular velocity about the A1 axis and/or the acceleration about the A1 and/or A2 axes exceeds the predetermined limits anywhere in the scan. (Or alternatively if the demanded position is unacceptable). If this is the case, then an error is indicated and the scan parameters are adjusted to overcome the problem, as will be discussed further below. However, it may not be possible to pre-calculate the acceleration, velocity or position values. In this case, if during a scan sudden steps in position demand are encountered, then the scan will abort and the scan parameters will need to be adjusted.

In a second method, the CAD drawings of the part to be measured are used to provide the bore elevation and diameter. Equations (2), (4), (7), (8), (9) and (10) are then used to determine whether for given values of probe length and stylus tip velocity, a maximum angular velocity about the A1 axis and/or the acceleration about the A1 and/or A2 axes will occur above the predetermined limits.

In a third method, some preliminary measurements may be taken to determine the bore elevation and radius. For example, measurements may be taken at the top and bottom of the bore or a spiral scan may be performed along the bore length to collect sufficient data to determine the bore elevation and radius. These may be used in equations (2), (4), (7), (8), (9) and (10) as described in the second method. Alternatively, the circumference of the bore may be partially scanned, avoiding the critical angle, at a single position along the bore's length, using the motorised scanning head and an estimation of the bore axis. If the scanning head is correctly positioned along the bore axis, an incomplete circular profile will result. Thus the bore elevation has been correctly estimated and the bore radius has been determined.

If a non-circular profile, such as a tear drop shaped profile results, the motorised scanning head may not have been on the bore axis. The tear drop shape results as nominally the intersection of a sphere and a cylinder. However sufficient data is available from the tear drop shaped profile to determine a theoretical centre line and radius of a perfect circle. The measurement data can be manipulated to produce a circular profile, all relating to the same height in Z of the bore. However this has the disadvantage that it provides data that wasn't actually measured and assumes that the shape was caused by mis-alignment and not the part itself. It is possible that the tear drop shaped profile may be due to the shape of the part (however this is unlikely). A second scan on the theoretical centre line will confirm this.

Thus using equations (2), (4), (7), (8), (9) and (10), as described in the second method, it may be determined whether the critical angle problem exists.

The critical angle problem may be overcome by changing one or more of the scan parameters. The width of the band where the problem exists, illustrated in FIG. 15 between lines 52,54, may be reduced by reducing the stylus tip speed V. The position/width of the band may also be changed by re-orientating the bore elevation θ or altering the probe length L.

For a non-contact probe, the probe offset may change instead of the probe length L. However the probe offset should be kept within its calibrated range.

Figure 16:
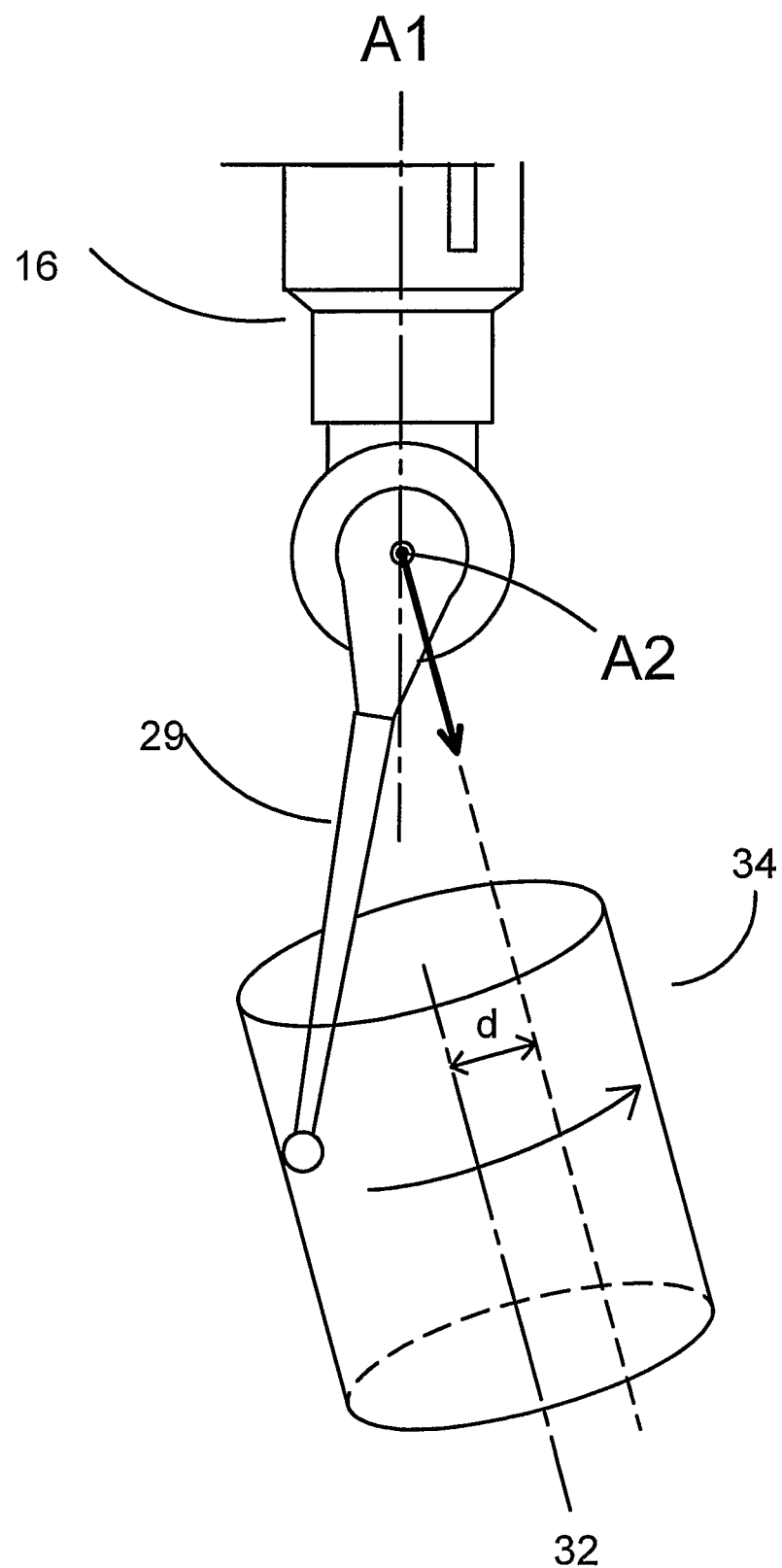
FIG. 16 illustrates a bore angled at a critical angle orientation being scanned by moving the scanning head along a path offset but parallel to the nominal centre line.

The critical angle problem may also be avoided by offsetting the path of the scanning head from the bore axis. FIG. 16 illustrates the motorised scanning head moving along a path 56 which is offset from the bore axis 32 by a distance d. The direction of d relative to the centre line will be indicated by whether it is positive or negative.

The maximum angular velocity about axis A1,ω, may be determined for the new scan path by the following equation:

$$\omega = \frac{V}{2\Pi \left| \sqrt{L^2 - (r+d)^2} \sin\theta - (r+d)\cos\theta \right|} \quad (13)$$

where d is the scanning head axis distance. d is signed such that a negative value implies offset toward the point on the bore surface at which A2 is closest to the critical angle.

Figure 17:
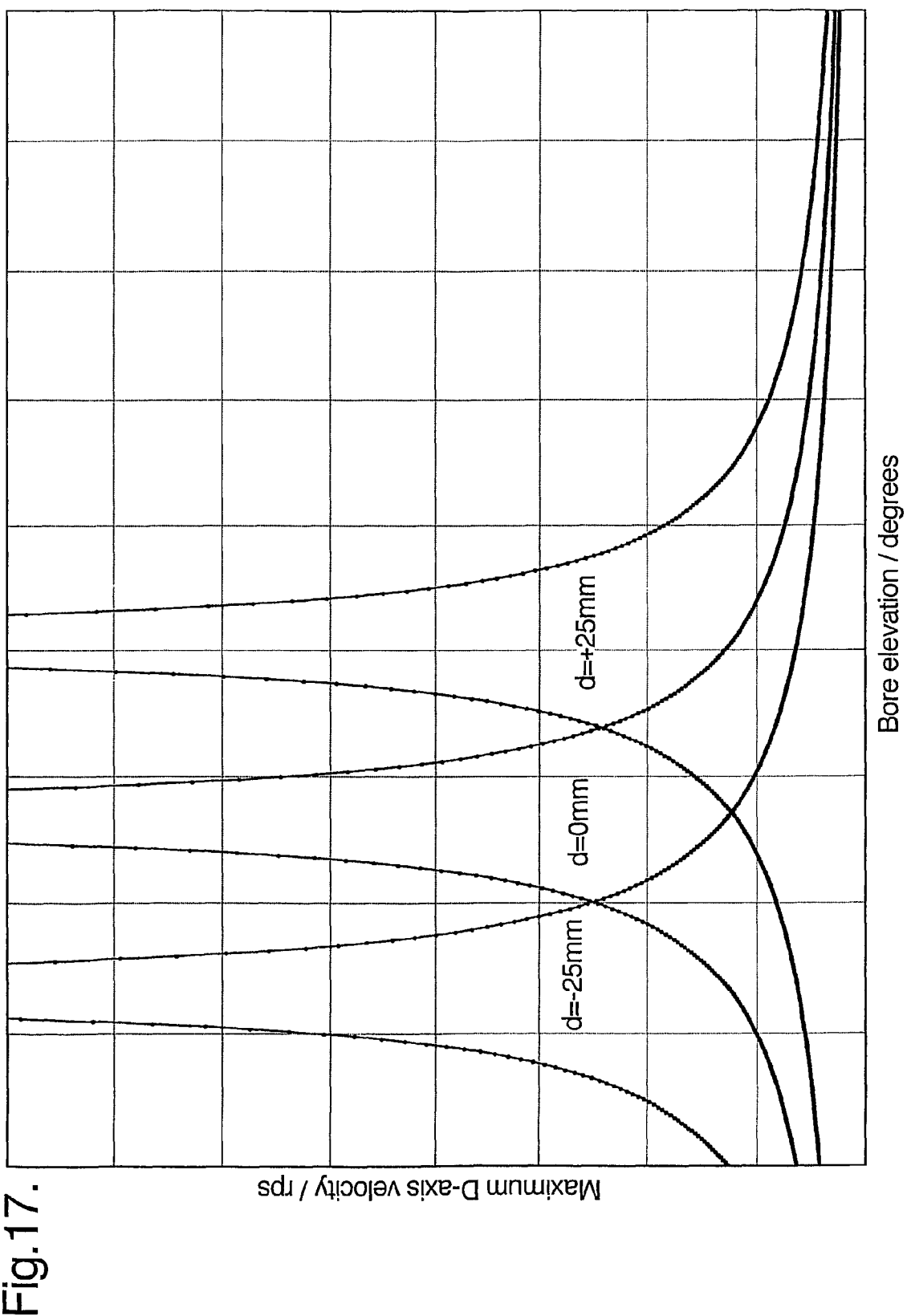
FIG. 17 is a graph of maximum angular velocity about A1 axis against bore elevation.

FIG. 17 is a graph of maximum angular velocity about A1 axis against bore elevation, for a given bore radius, stylus tip speed and probe length. The three sets of data show that the change in offset d changes the bore elevation at which the critical angle problem exists.

The required offset for a particular scan and a maximum permitted angular velocity about A1, ωmax can be determined by rearranging equation (13):

$$d = L\sin\left(\theta \pm \sin^{-1}\left(\frac{V}{2\Pi\omega\max L}\right)\right) - r \quad (14)$$

Figure 18A:
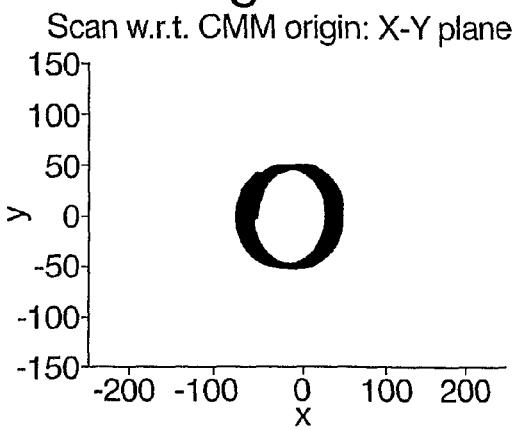
FIGS. 18A and 18B illustrate the scan profile in the XY and YZ planes respectively for a critical angle orientation bore using an offset trajectory.
Figure 18B:
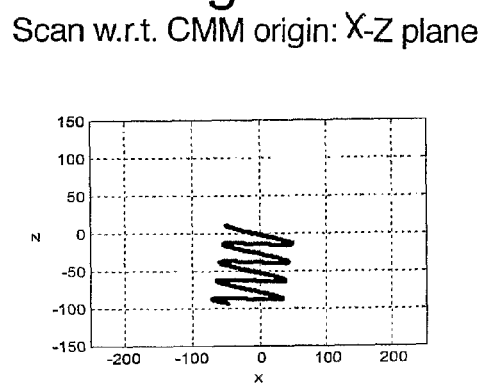

FIGS. 18A-18H illustrate a scan of a bore angled at the critical angle orientation. In this case the scanning head is moved along a trajectory parallel but offset to the nominal centre line of the bore. FIGS. 18A and 18B illustrate the scan profile in the XY and YZ planes respectively.

Figure 18C:
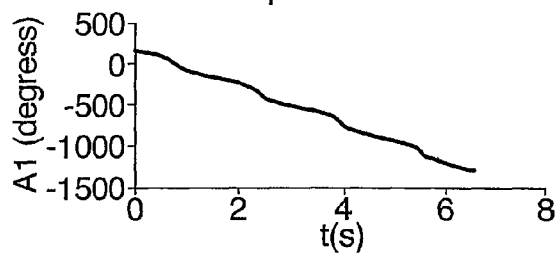
FIGS. 18C and 18D illustrate the stylus tip position about the A1 and A2 axes respectively during the scan of a critical angle orientation bore using an offset trajectory.
Figure 18D:
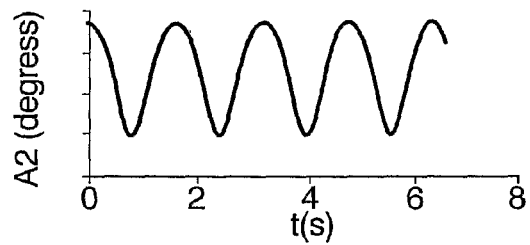

FIGS. 18C and 18D illustrate the stylus tip position about the A1 and A2 axes respectively. There are no step changes in stylus tip position about either the A1 and A2 axes.

Figure 18E:
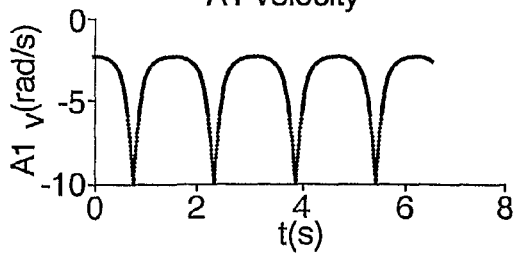
FIGS. 18E and 18F illustrate the stylus tip velocity about the A1 and A2 axes respectively during the scan of a critical angle orientation bore using an offset trajectory.
Figure 18F:
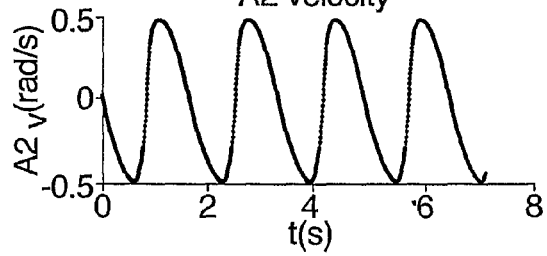
Figure 18G:
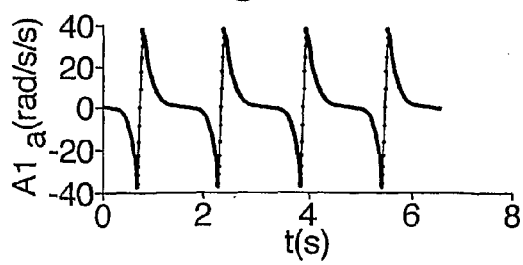
FIGS. 18G and 18H illustrate the stylus tip acceleration about the A1 and A2 axes respectively during the scan of a critical angle orientation bore using an offset trajectory.
Figure 18H:
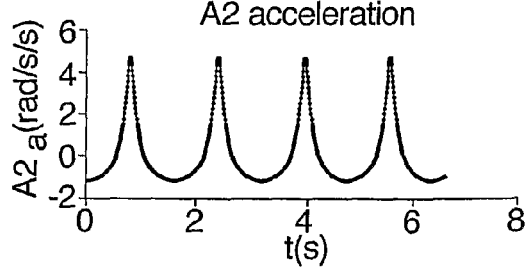

FIGS. 18E and 18F illustrate the stylus tip velocity about the A1 and A2 axes respectively whilst FIGS. 18G and 18H illustrate the stylus tip acceleration about the A1 and A2 axes respectively. There are no step changes in stylus tip velocity. In addition, there are no infinite velocities or accelerations required.

This method of offsetting the trajectory of the scanning head from the nominal centre line of the bore allows a bore angled at a critical angle orientation to be scanned without the need of altering the probe length.

As previously described, the normal trajectory of the scanning head is along the bore's nominal centre line which produces a symmetrical scan about the bore surface. Thus for a certain scanning head position, the stylus will intersect the bore profile on a plane orthogonal to the nominal centre line of the bore. However when the trajectory of the scanning head is offset from the nominal centre line, the scan will no longer be symmetrical around the bore surface. This results in areas on one side of the bore at one end and on the opposite side at the other end not being scanned.

If there is a requirement for measurements of these areas of the bore surface profile, additional scans may be carried out on these surfaces. Alternatively, the scan length can be extended or a second scan can be performed with the axis offset on another side of the axis.

The method of offsetting the trajectory of the scanning head is not limited to scanning a bore with a scanning head mounted on a vertical arm CMM. Other surface profiles may be measured using this method, such as cones, spheres and surfaces where the stylus tip approaches an angle of 0° about the A2 axis relative to the A1 axis during scanning.

For other surface profiles, it can be determined whether the surface profile is angled at a critical angle orientation by the following method. If the distance parallel to the A1 axis between the scanning head trajectory (i.e. the trajectory followed by the centre of the scanning head) and the surface is substantially the same as the probe length (distance from the probe's centre of rotation to its tip), then there is a critical angle problem. This may be tested by moving the scanning head to various points on its trajectory and using the head to rotate the probe tip in a direction towards the normal of the surface so that it passes through a line parallel to the A1 axis. The likelihood of a critical angle can be determined from the position at which the probe tip makes contact with the surface.

In the case of cones, the scanning head angle, velocity and acceleration profiles about the A1 and A2 axes do not repeat every revolution of the stylus tip around the cone's profile as the CMM moves the scanning head along the centre line of the profile. A critical or near critical angle may thus be encountered during one particular revolution of the probe tip but not during any other revolutions. Offsetting the trajectory of the scanning head from the cone's centre line may not remedy this situation, but only shift the critical or near critical angle to another revolution of the probe tip.

Figure 19:
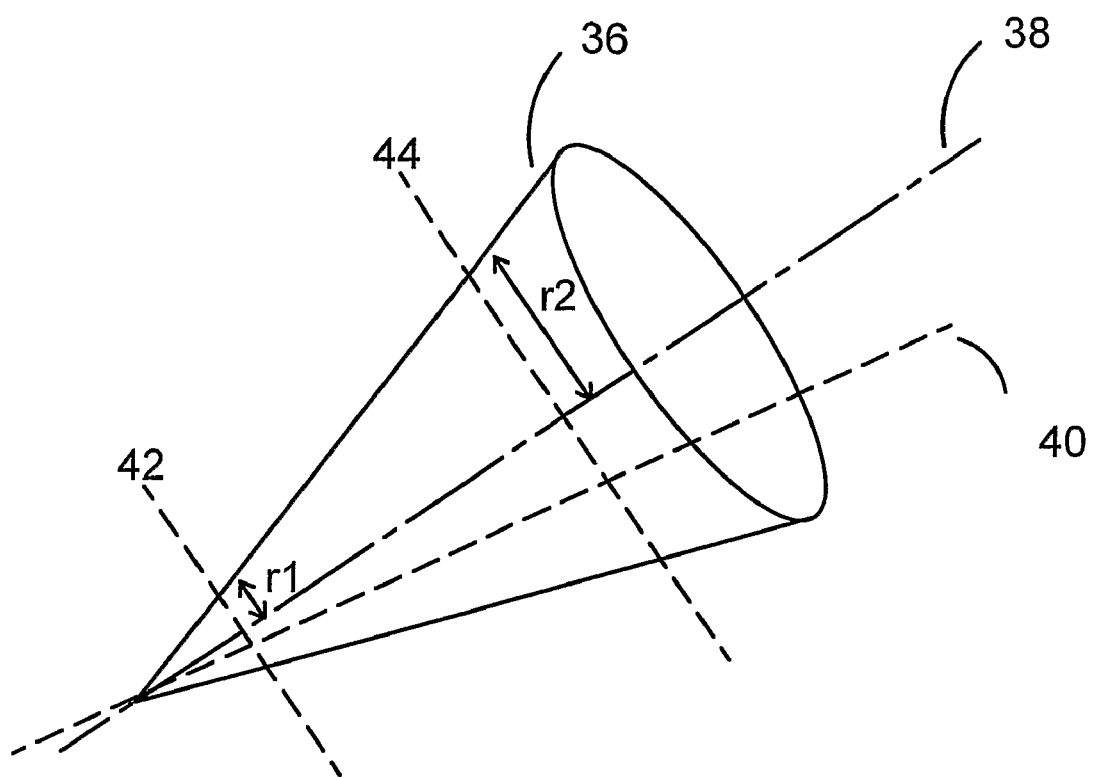
FIG. 19 illustrates a cone which is scanned using a trajectory offset from the nominal centre line.

This problem is overcome by changing the head trajectory so that the critical or near critical angle is not encountered anywhere during the scan. This modified trajectory does not need to be parallel to the centre line of the profile as previously described. FIG. 19 illustrates a conical surface profile 36 with a nominal centre line 38. The modified trajectory 40 is shown passing through the apex of the cone. A similar approach may be taken with spheres, or other surfaces which present the same problem.

As shown in FIG. 19, when scanning along and around the cone between two planes, a first plane 42 towards the apex of the cone having a "lower radius" r1 and a second plane 44 further away from the apex of the cone having an "upper radius" r2, the critical angle problem will occur if:

arcsine(lower radius/probe length)<=angle of nominal centre line of surface profile and arcsine(upper radius/probe length)>=angle of nominal centre line of surface profile.

In the above equations, the upper radius and lower radius are the radii of the profile plus (for convex profiles) or minus (for concave profiles) the probe tip radius.

These equations are also true for hemi-sphere. It is not required that the surface profile has a nominal centre line. Any surface profile may be scanned in which a trajectory is chosen to avoid the stylus becoming substantially parallel to the A1 axis.

An alternative solution to the critical angle problem involves changing the angular velocity of the scan and is described in more detail below. This method is suitable for scans which pass close to (but not through) the critical angle such that the required angular velocities and/or accelerations about the A1 and A2 axes exceed their permitted values.

The solution comprises the reduction of the angular velocity of the scan (i.e. stylus tip in the scan plane), thereby reducing the required angular velocities and accelerations about A1 and A2 axes.

The scan velocity may be reduced in different ways.

The scan velocity may be reduced for the whole scan or for a section of the scan in which permitted values would be exceeded. Alternatively, the reduction in scan velocity may take the form of a modulation, so that the scan velocity is varying throughout the scan and approaches its minimum when it is closest to the critical angle. The reduction in scan velocity may be applied using some other curve of velocity against scan position for each scan revolution.

This solution has the disadvantage that it cannot be used if the scan passes through the critical angle because at this point some of the required angular velocities and accelerations about A1 and A2 are infinite and this cannot be reduced by any factor due to the reduction of scan velocity.

This solution is thus suitable for scans in which the permitted maximums of angular velocity and accelerations are exceeded and the solution ensures that the angular velocities and accelerations about the A1 and A2 axes are always within permitted limits.

A further solution comprises using the gaps between measurement points to skip over the critical angle. This technique can be used for scans which pass through the critical angle and also for scans which contain a section close to the critical angle, including those for which the technique outlined above would require a reduction in scan angular velocity which was impractically large.

This solution applies to the discrete points that are generated to drive the probe tip around the scan profile. The gaps are arranged between these points such that a gap coincides with the critical angle. The scan then skips over the critical angle and hence does not require the impossible infinite velocities and accelerations about the A1 and A2 axes. The same principle can also be used to skip over a section of the scan for which the required angular velocities and accelerations about the A1 and A2 axes are prohibitive. The larger the section of the scan to be skipped, the greater the resulting distance between points (i.e. the lower the point density).

This solution may be combined with the solution above, as a reduction in scan velocity during the problematic scan section will reduce the length of section which requires prohibitive angular velocities and accelerations about the A1 and A2 axes. This will increase the maximum point density, which can be used to skip the section.

During the skip over the critical angle, the probe deflection will change and the probe may even leave the surface of the profile. Thus re-loading of the probe deflection on the surface may be required after the skip.

A combined methodology for dealing with the critical angle problem may be used. This detects which of several solutions (e.g. axis offset, slow down and combination of reducing scan velocity and skipping over the critical angle) is preferable, based on the specific numerical criteria for a given application. The scan parameters may then be modified accordingly and the scan performed.

If the orientation of the surface profile is not close to the critical angle orientation the bore may be measured as previously described. However, if the orientation of the surface profile is close to the critical angle orientation corrective measures must be taken.

In this case, the most appropriate solution is chosen, taking into consideration the other features on the part to be measured.

In deciding whether to reorient the part, access to the feature must be considered and also the other features to be scanned must be taken into account, i.e. whether there is sufficient access at the new orientation and whether the critical angle problem will occur for these other features at the new orientation.

Likewise, in deciding whether to change the length of stylus it must be taken into consideration the constraints of the feature itself. For example for a long bore, a long stylus may be required. Furthermore the stylus requirements for other features on the part may be taken into account to minimise changes of stylus which will slow down the total scan time.

When applying the solutions to the critical angle problem described above it is important to ensure that an axis shift which corrects one angular value does not result in a newly introduced excessive angular value for velocity or acceleration. In this case, a new offset must be calculated. This method allows the scan to proceed about a scan axis which is offset from the bore axis and is parallel to it, without any of the angular values exceeding the required values.

The scanning head may be mounted on any type of CMM, for example, a horizontal arm CMM, or may be mounted in any orientation. For example it may be mounted horizontally on the vertical arm CMM. The scanning head may be mounted on other types of coordinate positioning machines, such as a machine tool.

Although the embodiments above describe the use of a contact probe mounted on a motorised scanning head, this method is also suitable for use with a non-contact probe, such as an optical, capacitance or inductance probe.

Although the embodiments above describe scanning a surface profile, the method is also suitable for taking discrete measurements with a touch trigger probe.

This method is also suitable for use irrespective of whether motion about A1 and A2 axes is guided by the surface of a workpiece. For example, free space motion of the articulating probe head can also experience the critical angle problem as described above.

The critical angle problem for motion which is not guided by a specifically located geometry (real or virtual) can be solved by choosing an appropriate solution from those outlined above.

The methods described above therefore allow the prediction of any motion about the A1 and A2 axes which will pass through the critical angle, or sufficiently close to it to cause angular velocities and/or accelerations to become prohibitive. The methods also enable this problem to be solved by changing one or more of the scan parameters.

This invention is not limited to metrological scanning but is suitable for applications in fields other than metrology where the critical angle problem could occur.

The invention claimed is:

1. A method for planning a trajectory of an apparatus mounted on a coordinate positioning apparatus arranged to measure a surface profile in accordance with parameters, the mounted apparatus having a device mounted thereon, wherein the coordinate positioning apparatus is operable to produce relative movement between the mounted apparatus and a surface of the coordinate positioning apparatus along a trajectory and wherein the mounted apparatus includes a drive for producing rotational movement about two or more axes, the method comprising the steps of:

determining whether, for a given trajectory, a first axis of the device will become parallel or substantially parallel to a rotational axis of the mounted apparatus;

and if so, adjusting the parameters such that the first axis of the device will not become parallel or substantially parallel to a rotational axis of the mounted apparatus.

2. A method according to claim 1, wherein said mounted apparatus comprises a probe head.

3. A method according to claim 1, wherein the device comprises a surface sensing device.

4. A method according to claim 1, wherein the step of adjusting the parameters comprises reorientating a surface profile to be measured.

5. A method according to claim 1, wherein the step of adjusting the parameters comprises changing an angular velocity of the device.

6. A method according to claim 1, wherein the mounted apparatus comprises a probe head and the device mounted thereon comprises a non-contact probe, wherein the step of adjusting the parameters comprises changing an offset of the non contact probe.

7. A method according to claim 1, wherein the mounted apparatus comprises a probe head and the device mounted thereon comprises a surface sensing device wherein the probe head moves the surface sensing device by driving it to demanded position points nominally on a surface profile and wherein gaps between these points are chosen such that the first axis of the device will not become parallel or substantially parallel to a rotational axis of the mounted apparatus.

8. A method according to claim 1, wherein the step of determining whether, for the given trajectory, a first axis of the device will become parallel or substantially parallel to a rotational axis of the mounted apparatus is carried out whilst the mounted apparatus is traveling along said given trajectory.

9. A method according to claim 1, wherein the step of adjusting the parameters comprises choosing a new trajectory such that the first axis of the device will not become parallel or substantially parallel to a rotational axis of the mounted apparatus.

10. A method according to claim 1, wherein the mounted apparatus comprises a probe head and the device mounted thereon comprises a probe, the probe having a stylus, wherein the step of adjusting the parameters comprises changing the stylus length.

11. A method for measuring a surface profile using a surface detecting device mounted on a probe head on a coordinate positioning apparatus, wherein the coordinate positioning apparatus is operable to produce relative movement between the probe head and the surface profile along a trajectory and wherein the probe head includes a drive for producing rotational movement of the surface detecting device about two or more axes, such that the drive is operable to position the surface detecting device relative to a surface of the surface profile to enable measurements to be taken around the surface profile, a computing device performing the method comprising the steps of:

determining whether for a given trajectory, a longitudinal axis of the surface detecting device will become parallel or substantially parallel to a rotational axis of the probe head;

and if so, choosing a new trajectory, such that the longitudinal axis of the surface detecting device will not become parallel or substantially parallel to a rotational axis of the probe head.

12. A method according to claim 11, wherein the surface detecting device comprises a probe with a probe tip and wherein the longitudinal axis of the surface detecting device extends from the probe tip to an axis of the probe head, said longitudinal axis being normal to said axis of the probe head.

13. A method for measuring a surface profile according to claim 11, the surface profile having a nominal centre line, the method comprising the additional steps of:

operating the coordinating position apparatus to move the probe head along the new trajectory, said new trajectory being offset from the nominal centre line; and operating the drive of the probe head to move the surface detecting device around the surface of the surface profile.

14. A method according to claim 13, wherein the trajectory is offset parallel to said centre line.

15. A method according to claim 13, wherein the trajectory is not parallel to said centre line.

16. A method according to claim 13, wherein the surface profile comprises a bore.

17. A method for planning a trajectory of an apparatus mounted on a coordinate positioning apparatus arranged to measure a surface profile in accordance with parameters, wherein the coordinate positioning apparatus is operable to produce relative movement between the mounted apparatus and a surface of the coordinate positioning apparatus along a trajectory and wherein the mounted apparatus includes a drive for producing rotational movement about two or more axes, the method comprising the steps of:
  determining whether, for a given trajectory, an angular velocity or acceleration of the mounted apparatus about a rotational axis of the mounted apparatus will exceed a predetermined threshold;
  and if so, adjusting the parameters by choosing a new trajectory so that the angular velocity or acceleration of the mounted apparatus about said rotational axis is below said predetermined threshold, wherein the new trajectory is offset parallel to the given trajectory.

18. A method for planning a trajectory of an apparatus mounted on a coordinate positioning apparatus arranged to measure a surface profile in accordance with parameters, wherein the coordinate positioning apparatus is operable to produce relative movement between the mounted apparatus and a surface of the coordinate positioning apparatus along a trajectory and wherein the mounted apparatus includes a drive for producing rotational movement about two or more axes, the method comprising the steps of:
  determining whether, for a given trajectory, an angular velocity or acceleration of the mounted apparatus about a rotational axis of the mounted apparatus will exceed a predetermined threshold;
  and if so, adjusting the parameters by choosing a new trajectory so that the angular velocity or acceleration of the mounted apparatus about said rotational axis is below said predetermined threshold, wherein the mounted apparatus is a probe head with a surface sensing device mounted thereon and wherein the given trajectory is the nominal centre line of a surface profile to be measured by said surface sensing device and said new trajectory is offset parallel to said centre line.

19. A method for planning a trajectory of an apparatus mounted on a coordinate positioning apparatus arranged to measure a surface profile in accordance with parameters, wherein the coordinate positioning apparatus is operable to produce relative movement between the mounted apparatus and a surface of the coordinate positioning apparatus along a trajectory and wherein the mounted apparatus includes a drive for producing rotational movement about two or more axes, the method comprising the steps of:
  determining whether, for a given trajectory, an angular velocity or acceleration of the mounted apparatus about a rotational axis of the mounted apparatus will exceed a predetermined threshold;
  and if so, adjusting the parameters so that the angular velocity or acceleration of the mounted apparatus about said rotational axis is below said predetermined threshold;
  wherein the mounted apparatus comprises a probe head and the device mounted thereon comprises a probe, the probe having a stylus, and wherein the step of adjusting the parameters comprises changing the stylus length.

20. Apparatus for planning a trajectory of an apparatus mounted on a coordinate positioning apparatus arranged to measure a surface profile in accordance with parameters, the mounted apparatus having a device mounted thereon, wherein the coordinate positioning apparatus is operable to produce relative movement between the mounted apparatus and a surface of the coordinate positioning apparatus and wherein the mounted apparatus includes a drive for producing rotational movement about two or more axes, the mounted apparatus comprising a computing device to perform the steps of:
  determining whether for a given trajectory, a first axis of the device will become parallel or substantially parallel to a rotational axis of the mounted apparatus;
  and if so, adjusting the parameters such that the first axis of the device will not become parallel or substantially parallel to a rotational axis of the mounted apparatus.

* * * * *